United States Patent
Hatanaka et al.

(10) Patent No.: US 11,892,387 B2
(45) Date of Patent: Feb. 6, 2024

(54) INFORMATION PROCESSING APPARATUS AND METHOD AND SYSTEM FOR PARTICLE SIMULATION

(71) Applicant: FUJITSU LIMITED, Kawasaki (JP)

(72) Inventors: Kohei Hatanaka, Fujisawa (JP); Tamon Suwa, Kawasaki (JP); Masaki Kazama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 866 days.

(21) Appl. No.: 16/902,303

(22) Filed: Jun. 16, 2020

(65) Prior Publication Data
US 2021/0003493 A1 Jan. 7, 2021

(30) Foreign Application Priority Data
Jul. 1, 2019 (JP) ................................. 2019-123149

(51) Int. Cl.
G06F 30/25 (2020.01)
G01N 15/10 (2006.01)

(52) U.S. Cl.
CPC ......... G01N 15/1012 (2013.01); G06F 30/25 (2020.01); *G01N 2015/1025* (2013.01); *G01N 2015/1075* (2013.01)

(58) Field of Classification Search
CPC ....... G01N 15/1012; G01N 2015/1025; G01N 2015/1075; G06F 30/25
See application file for complete search history.

(56) References Cited

U.S. PATENT DOCUMENTS 8,279,227 B2 * 10/2012 Cohen ..................... G06T 13/20
345/473
2006/0149516 A1 * 7/2006 Bond ...................... G06F 30/20
703/6

(Continued)

FOREIGN PATENT DOCUMENTS

EP 2509009 A1 10/2012
JP 2010-72379 A 4/2010

(Continued)

OTHER PUBLICATIONS

Extended European Search Report dated Dec. 1, 2020 for corresponding European Patent Application No. 20179394.0, 23 pages.
*Please note US-2015/0213163-A1 cited herewith, was previously cited in an IDS filed on Jun. 16, 2020.*.

(Continued)

*Primary Examiner* — Kibrom K Gebresilassie
(74) *Attorney, Agent, or Firm* — Fujitsu Intellectual Property Center

(57) ABSTRACT

Technique includes acquiring first contact data of first time, associated with first particle in first region; calculating first position data on particles in the first region at second time, and receiving second position data on particles in second region at the second time; detecting second particle being in contact with the first particle and in the first region at the first time and being in the first region at the second time; copying, when the first and second particles are in contact at the second time, displacement of the second particle from the first contact data to second contact data of the second time; detecting third particle being in the first or second region at the second time and in contact with the first particle; and copying, when the third particle is listed in the first contact data, displacement of the third particle to the second contact data therefrom.

9 Claims, 16 Drawing Sheets

(56) References Cited

U.S. PATENT DOCUMENTS

2008/0270092 A1* 10/2008 Cohen .................... G06F 30/20
              703/7
2013/0297270 A1   11/2013 Cleary
2015/0213163 A1    7/2015 Yang et al.

FOREIGN PATENT DOCUMENTS

| JP | 2013-541759 A | 11/2013 |
|----|---------------|---------|
| JP | 2015-530636 A | 10/2015 |
| WO | 2012/034176 A1 | 3/2012 |
| WO | 2014/094410 A1 | 6/2014 |

OTHER PUBLICATIONS

Gan, J. Q. et al., "A GPU-based DEM approach for modelling of particulate systems", Powder Technology, Elsevier, Basel (CH), vol. 301, Jul. 30, 2016, pp. 1172-1182, XP029729020.

Nishiura, Daisuke et al., "Parallel-vector algorithms for particle simulations on shared-memory multiprocessors", Journal of Computational Physics, London, GB, vol. 230, No. 5, Mar. 1, 2011, pp. 1923-1938, XP027601172, [retrieved on Jan. 13, 2011].

Chinese Office Action dated Sep. 21, 2023 for corresponding Chinese Patent Application No. 202010597103.6, 25 pages. *Please note US-2008-0270092-A1 cited herewith, was previously on Aug. 3, 2023.*.

European Patent Office Action dated Apr. 5, 2022 for corresponding European Patent Application No. 20179394.0, 16 pages.

* cited by examiner

RESULT TABLE 131

| TIME STEP NO. | GLOBAL ID | POSITION |
|---|---|---|
| 1 | ID1 | (X01, Y01) |
| 1 | ID2 | (X02, Y02) |
| ... | ... | ... |
| 2 | ID1 | (X11, Y11) |
| 2 | ID2 | (X12, Y12) |
| ... | ... | ... |

FIG. 10

INFORMATION PROCESSING APPARATUS AND METHOD AND SYSTEM FOR PARTICLE SIMULATION

CROSS-REFERENCE TO RELATED APPLICATION

This application is based upon and claims the benefit of priority of the prior Japanese Patent Application No. 2019-123149, filed on Jul. 1, 2019, the entire contents of which are incorporated herein by reference.

FIELD

The embodiments discussed herein relate to an information processing apparatus, particle simulation method, and particle simulation system.

BACKGROUND

Discrete element method (DEM), also called distinct element method, is a simulation scheme for analyzing the behavior of an object. The DEM scheme models the object to be analyzed as an assembly of particles in the shape of, for example, a disc or sphere, and tracks the motion of the particles in consideration of contact and sliding between the particles. The DEM scheme is sometimes used to analyze the behavior of powder, such as sediment grains, chemicals, and printer toner particles.

The DEM scheme detects particles with which a given particle is in contact, then calculates contact forces exerted by all the neighboring particles in contact with the particle, and finds, based on the contact forces, the position of the particle for a later predetermined time. Time steps of a predetermined time period are taken over the course of the simulation, and the calculation cycle alternates between the detection of the neighboring particles in contact, the calculation of the contact forces, and the update of the position of the particle. Herewith, the DEM scheme simulates changes in the position of each particle along the time axis.

There is a proposed analysis apparatus for achieving savings in computational effort associated with DEM simulations. To reduce computational complexity, the analysis apparatus divides a region to be analyzed into a plurality of cells, and then limits particles to be examined if they are in contact with a target particle (this process is termed "contact detection") to those in neighboring cells adjacent to a cell containing the target particle. A simulation system is another proposed technique which offers savings in computational effort involved in DEM simulations. To this end, the simulation system generates a neighbor list indicating particles that may come into contact with a target particle during a particular period of time and performs contact detection only for the particles included in the neighbor list at each time step. There is a yet another proposed simulation system which assigns particles to a plurality of nodes and runs DEM calculations in parallel.

See, for example, Japanese Laid-open Patent Publication No. 2010-72379; International Publication Pamphlet No. WO 2012/034176; and International Publication Pamphlet No. WO 2014/094410.

In the DEM scheme, to calculate contact forces on a given particle exerted by another particle in contact, the cumulative displacement during the two particles being in contact is sometimes used. For example, in calculating the contact force which is decomposed into the normal and tangential components, the tangential contact force may depend on the cumulative relative travel distance in the tangential direction made up to the current time after the contact is formed. Therefore, when the time on the simulation clock advances, a copy process takes place where, for each pair of particles in continuous contact, the displacement at the previous time is copied to the current time.

The copy process involving identifying particles with which a given particle is in contact at both the previous and current time points and copying the displacement of each of the identified particles in contact is a computationally expensive task. For example, one of the simplest copy process methods is to extract particles in contact with a given particle at the current time point based on the positions of the individual particles at the current time point, and then search for these extracted particles from contact data which indicates particles in contact at the previous time point. A drawback of this method is the contact data of the previous time point being repeatedly scanned, and such comparison tasks become computationally intensive.

In view of this, it may be considered reasonable to change the procedure of the copy process to thereby reduce computational complexity. It is, however, not straightforward to alter the copy process procedure in parallel particle simulations where the entire region over which particles are possibly distributed is divided into subregions and a plurality of nodes is assigned different subregions for parallel execution.

In parallel particle simulations, particles belonging to a subregion may come into contact with other particles belonging to a neighboring subregion at the boundary between the two subregions. Therefore, the multiple nodes need to exchange data on particles near their boundaries. Note however that each node is able to efficiently track the movements of particles in its assigned subregion but not in neighboring subregions. For this reason, if the copy process is performed in a unified manner without distinguishing whether each contact particle belongs to its assigned subregion or a neighboring subregion, it is hard to reduce computational complexity.

SUMMARY

According to an aspect, there is provided an information processing apparatus including a storing unit configured to store first contact data associated with a first particle belonging to a first region, the first contact data indicating one or more contact particles in contact with the first particle at a first time and a cumulative displacement of the first particle relative to each of the contact particles, having occurred over a contact period up to the first time after the contact is formed; and a processing unit configured to execute a process including calculating first position data indicating positions of particles belonging to the first region at a second time following the first time, and acquiring, from a different information processing apparatus, second position data indicating positions of particles belonging to a second region at the second time, the second region bordering on the first region; detecting, based on a calculation result obtained from the first contact data and the first position data, a second particle which is in contact with the first particle and belongs to the first region at the first time and belongs to the first region at the second time; examining, based on the first position data, whether the first particle and the second particle are in contact with each other at the second time, and copying, when the first particle and the second particle are in contact at the second time, the cumulative displacement of the second particle from the first contact data to second contact data corresponding to the second time; detecting, based on the first position data and the second position data, third particles which are particles, other than the second particle, individually belonging to the first region or the second region and are in contact with the first particle at the second time; and searching the first contact data for the third particles and, copying, when each of the third particles is registered in the first contact data, the cumulative displacement of the registered third particle from the first contact data to the second contact data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an exemplary result table;

DESCRIPTION OF EMBODIMENTS

Several embodiments will be described below with reference to the accompanying drawings.

(a) First Embodiment

A first embodiment is described hereinafter.

Figure 1:
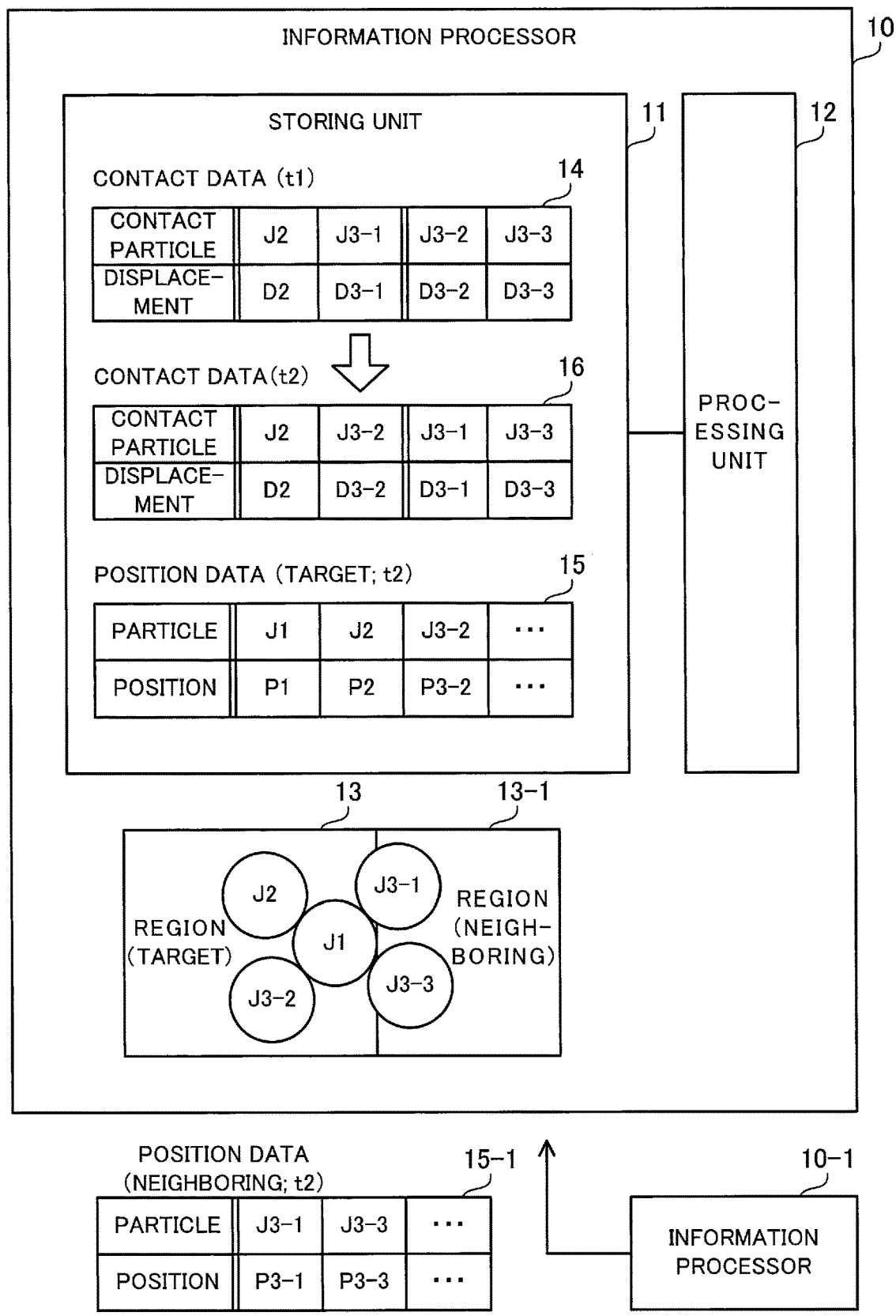
FIG. 1 illustrates an exemplary information processing system according to a first embodiment.

FIG. 1 illustrates an exemplary information processing system according to the first embodiment.

The information processing system according to the first embodiment performs particle simulations for simulating the motion of powder particles using the DEM scheme. The information processing system of the first embodiment includes a plurality of information processors, including information processors 10 and 10-1. The information processing system of the first embodiment may also be referred to as a parallel processing system, simulation system, or simulator. In parallel processing of a particle simulation, simulation space where particles are possibly distributed is divided into regions, and different information processors are assigned different regions. Each of the information processors, including the information processors 10 and 10-1, simulates the movements of particles belonging to its assigned region (target region). Each information processor may also be referred to as a computer, node, or simulation unit. The multiple information processors are connected to a network and are thereby capable of exchanging data. As will be described later, the information processor 10 is in charge of a region 13, and the information processor 10-1 is in charge of a region 13-1.

The information processor 10 includes a storing unit 11 and a processing unit 12. The storing unit 11 may be volatile semiconductor memory such as random access memory (RAM), or a non-volatile storage device such as a hard disk drive (HDD) or flash memory. The processing unit 12 is, for example, a processor such as a central processing unit (CPU), graphics processing unit (GPU), or digital signal processor (DSP). Note however that, the processing unit 12 may include an electronic circuit designed for specific use, such as an application specific integrated circuit (ASIC) or field programmable gate array (FPGA). The processor executes programs stored in memory such as RAM (or in the storing unit 11). The term "multiprocessor", or simply "processor", may be used to refer to a set of multiple processors.

According to the DEM scheme, the information processor 10 repeats the following procedure: examining contact particles with which a target particle is in contact at the current time point; calculating contact forces on the target particle exerted by the contact particles; and calculating, based on the contact forces, the position of the target particle for the next time point. At each simulation time point, the information processor 10 generates contact data indicating contact particles.

The calculation of the contact forces uses the cumulative displacement having occurred during the target particle and each contact particle being in contact with each other. The cumulative displacement is, for example, the sum of the incremental travel distances of the target particle relative to each contact particle in the tangential direction, made over each time step from the time the contact is formed. Therefore, the information processor 10 records, in the contact data, the cumulative displacement of each simulation time point. At this time, for each contact particle remaining in contact with the target particle, the cumulative displacement recorded in the contact data of the previous time point needs to be copied to the contact data of the current time point, and then an incremental displacement at the current time point is added to the copied cumulative displacement.

The storing unit 11 stores therein contact data 14 (first contact data). The storing unit 11 may further store position data 15 (first position data), position data 15-1 (second position data), and contact data 16 (second contact data) to be described below.

The contact data 14 is contact data of simulation time point t1 (first time), associated with a particle J1 (first particle) belonging to the region 13, which is assigned to the information processor 10. The contact data 16 is contact data of simulation time point t2 (second time) following time point t1, associated with the particle J1. Time point t2 occurs, for example, a predetermined unit of time later than time point t1. The contact data 14 indicates a contact particle in contact with the particle J1 at time point t1, and a displacement of the particle J1 relative to the contact particle, made up to time point t1 after the contact is formed. The contact data 16 indicates a contact particle in contact with the particle J1 at time point t2, and a displacement of the particle J1 relative to the contact particle, made up to time point t2 after the contact is formed. For example, each of the contact data 14 and 16 includes identification information of the contact particle and a displacement associated with the contact particle. If there is a plurality of contact particles in contact with the particle J1, the contact data 14 and 16 enumerates, for example, a plurality of identification information pieces of the contact particles and a plurality of displacements, which are mapped to each other.

The position data 15 indicates the positions of particles at time point t2, belonging to the region 13 of which the information processor 10 is in charge. The position data 15-1 indicates the positions of particles at time point t2, belonging to the region 13-1 of which the information processor 10-1 is in charge. The region 13-1 borders on the region 13. The position data 15-1 may include, amongst the particles belonging to the region 13-1, only some particles within a predetermined distance from the boundary between the regions 13 and 13-1. The position data 15 is generated by the information processor 10 while the position data 15-1 is generated by the information processor 10-1.

The processing unit 12 advances the time on the simulation clock from time point t1 to time point t2. At that time, the processing unit 12 generates the position data 15. For example, the processing unit 12 calculates the contact forces acting on each particle belonging to the region 13 based on contact data of time point t1, such as the contact data 14, and then calculates, based on the calculated contact forces and position data indicating the position of each particle in the region 13 at time point t1, the positions of the particles for time point t2. In addition, the processing unit 12 acquires the position data 15-1 received from the information processor 10-1. The position data 15-1 is generated by the information processor 10-1 in the same manner as the position data 15.

When the time on the simulation clock advances from time point t1 to time point t2, some particles may cross the boundary between the regions 13 and 13-1 to the other region. Particles belonging to the region 13 at time point t1 may, at time point t2, still remain in the region 13 or have moved to the region 13-1. Similarly, particles belonging to the region 13-1 at time point t1 may, at time point t2, still remain in the region 13-1 or have moved to the region 13. Each particle is managed by an information processor in charge of the destination region of the particle.

Next, the processing unit 12 generates the contact data 16 of time point t2. At that time, based on calculation results obtained from the contact data 14 and the position data 15, the processing unit 12 detects a second particle which is in contact with the particle J1 and belongs to the region 13 at time point t1 and then still belongs to the region 13 at time point t2.

For example, the processing unit 12 assigns different identification information pieces to each particle for time points t1 and t2. In this regard, when calculating the position data 15, the processing unit 12 generates mapping data which maps, for each particle belonging to the region 13, the identification information piece of time point t1 to that of time point t2. Because the region 13 is the only region over which the information processor 10 tracks the movements of particles, the mapping data includes particles belonging to the region 13 at both time points t1 and t2. That is, the mapping data does not include particles having moved out of the region 13 into the region 13-1, particles having moved out of the region 13-1 into the region 13, and particles remaining in the region 13-1. In this case, the processing unit 12 searches the mapping data for an identification information piece of time point t2 mapped to each identification information piece of time point t1 included in the contact data 14, to thereby detect the second particle satisfying the aforementioned condition.

The processing unit 12 examines, based on the position data 15, whether the particle J1 and the aforementioned second particle are in contact with each other at time point t2. If they are in contact, the processing unit 12 copies the displacement associated with the second particle from the contact data 14 to the contact data 16. For example, the processing unit 12 detects a particle J2, which is in contact with the particle J1 and belongs to the region 13 at time point t1 and then belongs to the region 13 at time point t2. At time point t2, the particles J1 and J2 are in contact with each other. The processing unit 12 therefore copies a displacement D2 associated with the particle J2 from the contact data 14 to the contact data 16.

Next, based on the position data 15 and 15-1, the processing unit 12 detects, other than the second particle, third particles which individually belong to the region 13 or 13-1 and are in contact with the particle J1 at time point t2. The processing unit 12 searches the contact data 14 for the third particles. If each third particle described above is registered in the contact data 14, the processing unit 12 copies the displacement associated with the third particle from the contact data 14 to the contact data 16.

For example, the processing unit 12 detects particles J3-1, J3-2, and J3-3 that are in contact with the particle J1 at time point t2. The particle J3-1 belongs to the region 13 at time point t1 and has moved to the region 13-1 at time point t2. The particle J3-2 belongs to the region 13-1 at time point t1 and has moved to the region 13 at time point t2. The particle J3-3 belongs to the region 13-1 at both time points t1 and t2. The processing unit 12 searches the contact data 14 for the individual particles J3-1, J3-2, and J3-3. The particles J3-1, J3-2, and J3-3 are registered in the contact data 14. Hence, the processing unit 12 copies displacements D3-1, D3-2, and D3-3 associated with the particles J3-1, J3-2, and J3-3, respectively, from the contact data 14 to the contact data 16. Note that the contact data 14 and 16 may distinguish between contact particles belonging to the region 13 and those belonging to the region 13-1.

According to the information processing system of the first embodiment, in a particle simulation, the contact data 16 is generated which indicates contact particles in contact with the particle J1 at time point t2 and displacements individually associated with these contact particles. This allows efficient calculation of contact forces on the particle J1 exerted by the contact particles at time point t2, which in turn facilitates efficient calculation of the position of the particle J1 for time point t3 following time point t2.

In addition, when the contact data 16 is generated, the second particle which is in contact with the particle J1 and belongs to the region 13 at time step t1 and then remains in the region 13 at time point t2 is detected with the use of the contact data 14 of time point t1. As for the second particle, after the contact of the second particle with the particle J1 at time point t2 is confirmed, the displacement associated with the second particle is copied from the contact data 14 of time point t1 to the contact data 16 of time point t2. This eliminates the need to repeatedly search the contact data 14 for particles remaining in the region 13, thus reducing computational complexity resulting from comparison tasks. As a result, it is possible to provide a more efficient way of copying displacements from the contact data 14 to the contact data 16.

Further, other than the aforementioned second particle, the third particles in contact with the particle J1 at time point t2 are detected. The third particles include particles having moved from the region 13 into the region 13-1; particles having moved from the region 13-1 into the region 13; and particles remaining in the region 13-1. As for these third particles, searches are made from the contact data 14. Then, for each third particle found in the contact data 14, the displacement associated with the third particle is copied from the contact data 14 to the contact data 16.

As described above, different copying procedures are adopted for contact particles remaining in the region 13 and other contact particles. This is because, for particles belonging to the region 13, their movements are tracked efficiently due to the region 13 being the target region of the information processor 10; whereas, for particles belonging to the neighboring region 13-1, it is difficult for the information processor 10 to efficiently track their movements. According to the first embodiment, separating contact particles remaining in the region 13 from other contact particles makes the copying procedures efficient, at least for the former contact particles. This results in reducing computational complexity in the copy process.

(b) Second Embodiment

Next described is a second embodiment.

Figure 2:
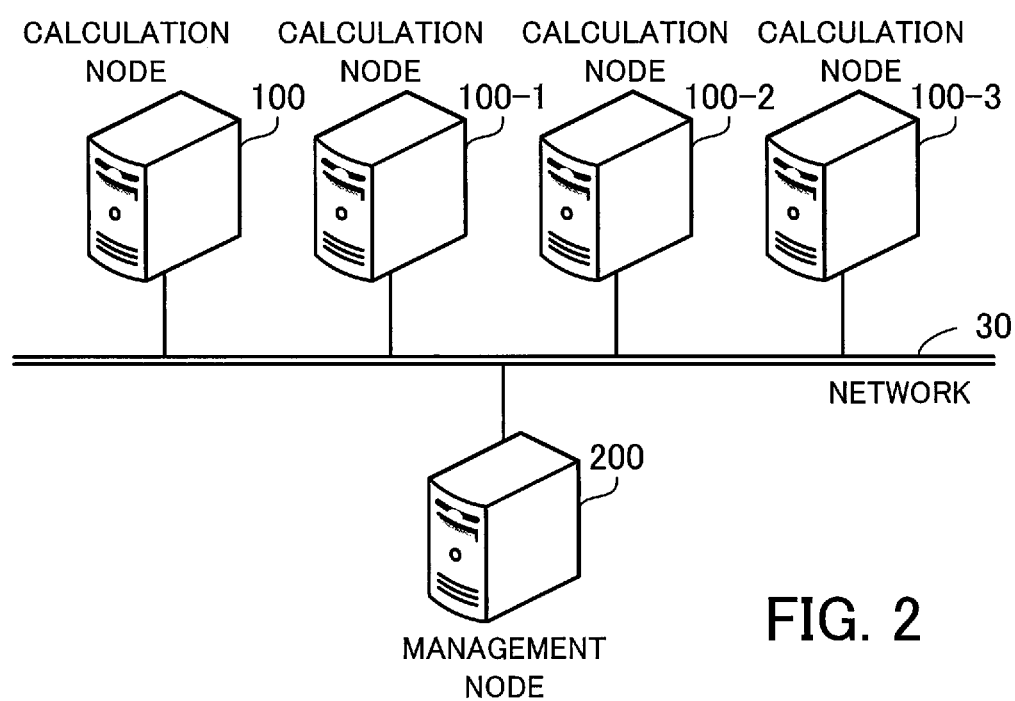
FIG. 2 illustrates an exemplary information processing system according to a second embodiment.

FIG. 2 illustrates an exemplary information processing system according to the second embodiment.

The information processing system according to the second embodiment is a parallel processing system for simulating the motion of a large number of particles using the DEM scheme. The DEM scheme tracks changes in the position and velocity of each particle with consideration for contacts between particles. The DEM scheme starts with the first time step where each particle is placed in its initial position, and the simulation clock is advanced in discrete time steps of very short duration. The position and velocity of each particle is updated at every time step along the time axis. Particles' geometries modeled in the DEM scheme may be two-dimensional (2D) disks or three-dimensional (3D) spheres. Note, however, that the second embodiment assumes that the particles simulated are 2D disks for ease of explanation.

The information processing system according to the second embodiment includes a plurality of calculation nodes, such as calculation nodes 100, 100-1, 100-2, and 100-3, and a management node 200. The multiple calculation nodes and the management node 200 are individually connected to a network 30, which is a data communication network, for example, a local area network (LAN). Note that the calculation node 100 corresponds to the information processor 10 of the first embodiment. The calculation node 100-1 corresponds to the information processor 10-1 of the first embodiment.

The multiple calculation nodes are server computers for calculating the positions and velocities of a large number of particles for each time step in a dispersed manner. An entire region of simulation over which particles are possibly distributed is divided into a plurality of subregions, and each subregion is assigned to one process. Each calculation node used in the DEM scheme executes one process to which one subregion is assigned. Therefore, using the multiple calculation nodes, multiple processes corresponding to the multiple subregions are executed in parallel. For ease of explanation, the second embodiment assumes a case where the entire region is divided into four subregions and four processes are executed in parallel using the four calculation nodes 100, 100-1, 100-2, and 100-3. Note however that it is possible to increase the number of subregions and use an increased number of calculation nodes.

Each of the calculation nodes 100, 100-1, 100-2, and 100-3 advances one time step and updates the positions and velocities of particles existing in its assigned subregion. As a result, particles existing in the assigned subregion during the previous time step may move out of the assigned subregion. In view of this, the calculation nodes 100, 100-1, 100-2, and 100-3 communicate with each other every time step and exchange particle data of particles having moved across boundaries to neighboring subregions. In addition, amongst particles in the assigned subregion, those located near the boundary with a neighboring subregion may be in contact with particles in the neighboring subregion. Therefore, the calculation nodes 100, 100-1, 100-2, and 100-3 communicate with each other every time step, and copy particle data of particles near their boundaries and share the copied particle data. Note that the second embodiment describes the DEM processing, focusing on the calculation node 100.

The management node 200 controls the parallel processing of the DEM scheme where the multiple calculation nodes are employed. Specifically, the management node 200 receives, from the user, input data including initial positions of individual particles. The management node 200 divides the entire simulation region into a plurality of subregions, then allots particle data to each subregion according to the initial positions of individual particles, and generates input data for each of the subregions. The management node 200 assigns one of the subregions to each of the calculation nodes 100, 100-1, 100-2, and 100-3, and transmits the input data of each assigned subregion to the corresponding calculation node.

Upon completion of all time steps, the management node 200 collects result data from the calculation nodes 100, 100-1, 100-2, and 100-3. The result data includes the positions of particles at each time step. Each of the calculation nodes 100, 100-1, 100-2, and 100-3 transmits, to the management node 200, the result data including the positions of particles during the particles individually existing in the assigned subregion. The management node 200 may store the result data in a non-volatile storage device such as an HDD. In addition, the management node 200 may present the result data on a display unit. For example, the management node 200 may display video in which each particle is represented by a dot and changes in the position of the particle are represented by movements of the dot. In addition, the management node 200 may transmit the result data to different information processors.

Note that the calculation nodes 100, 100-1, 100-2, and 100-3 and the management node 200 may be implemented not as independent computers but as different processors arranged in a parallel processing unit which includes a large number of processors. In addition, one of the calculation nodes 100, 100-1, 100-2, and 100-3 may undertake the processing of the management node 200.

Figure 3:
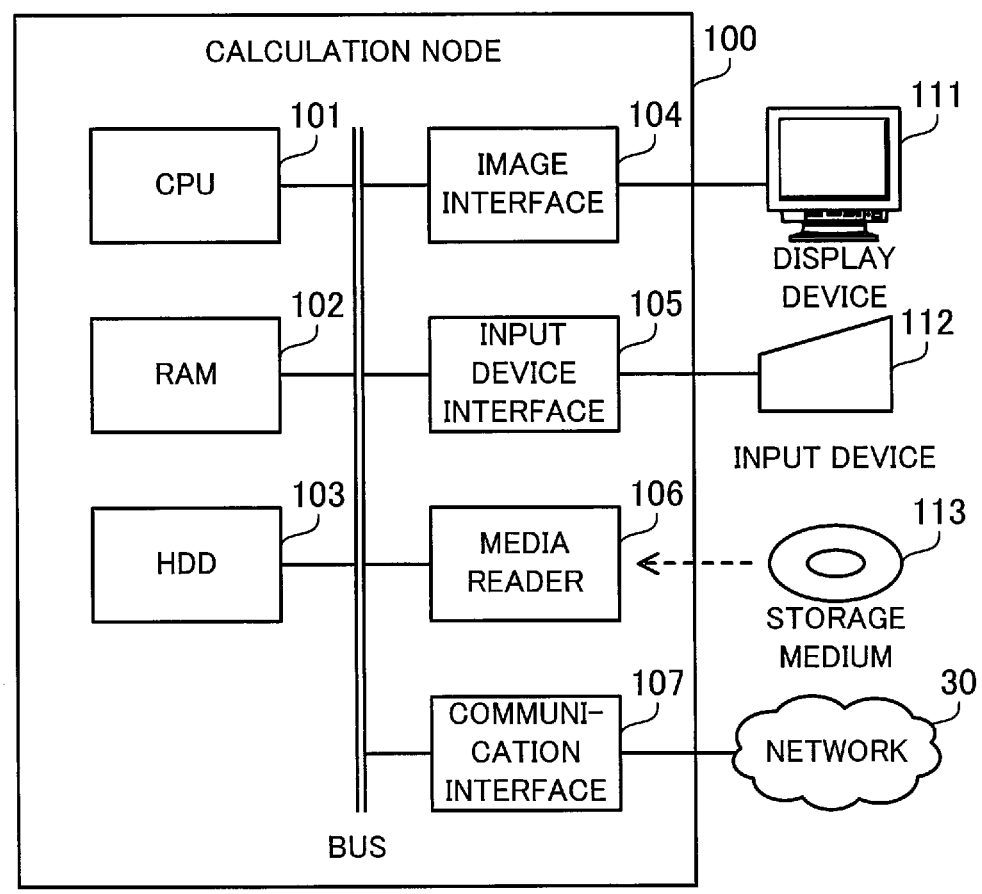
FIG. 3 is a block diagram illustrating an exemplary hardware configuration of a calculation node.

FIG. 3 is a block diagram illustrating an exemplary hardware configuration of a calculation node.

The calculation node 100 includes a CPU 101, a RAM 102, an HDD 103, an image interface 104, an input device interface 105, a media reader 106, and a communication interface 107. These units are individually connected to a bus. The CPU 101 corresponds to the processing unit 12 of the first embodiment. The RAM 102 or the HDD 103 corresponds to the storing unit 11 of the first embodiment. The same hardware configuration of the calculation node 100 of FIG. 3 is similarly applied to the other calculation nodes and the management node 200.

The CPU 101 is a processor configured to execute program instructions. The CPU 101 reads out at least part of programs and data stored in the HDD 103, loads them into the RAM 102, and executes the loaded programs. Note that the CPU 101 may include two or more processor cores and the calculation node 100 may include two or more processors. The term "multiprocessor", or simply "processor", may be used to refer to a set of processors.

The RAM 102 is volatile semiconductor memory for temporarily storing therein programs to be executed by the CPU 101 and data to be used by the CPU 101 for its computation. Note that the calculation node 100 may be provided with a different type of memory other than RAM, or may be provided with two or more memory devices.

The HDD 103 is a non-volatile storage device to store therein software programs, such as an operating system (OS), middleware, and application software, and various types of data. Note that the calculation node 100 may be provided with a different type of storage device, such as flash memory or a solid state drive (SSD), or may be provided with two or more storage devices.

The image interface 104 produces video images in accordance with drawing commands from the CPU 101 and displays them on a screen of a display device 111 coupled to the calculation node 100. The display device 111 may be any type of display, such as a cathode ray tube (CRT) display; a liquid crystal display (LCD); an organic electro-luminescence (OEL) display, or a projector. In addition, an output device, such as a printer, other than the display device 111 may also be connected to the calculation node 100.

The input device interface 105 receives an input signal from an input device 112 connected to the calculation node 100. Various types of input devices may be used as the input device 112, for example, a mouse, a touch panel, a touchpad, or a keyboard. A plurality of types of input devices may be connected to the calculation node 100.

The media reader 106 is a device for reading programs and data recorded on a storage medium 113. Various types of storage media may be used as the storage medium 113, for example, a magnetic disk such as a flexible disk (FD) or an HDD, an optical disk such as a compact disc (CD) or a digital versatile disc (DVD), and semiconductor memory. The media reader 106 copies the programs and data read out from the storage medium 113 to a different storage medium, for example, the RAM 102 or the HDD 103. The read programs are executed, for example, by the CPU 101. Note that the storage medium 113 may be a portable storage medium and be used to distribute the programs and data. In addition, the storage medium 113 and the HDD 103 are sometimes referred to as computer-readable storage media.

The communication interface 107 is connected to the network 30 and communicates with different calculation nodes and the management node 200 via the network 30. The communication interface 107 is a wired communication interface connected to a wired communication device, such as a switch or router.

Next described is the DEM scheme.

Figure 4:
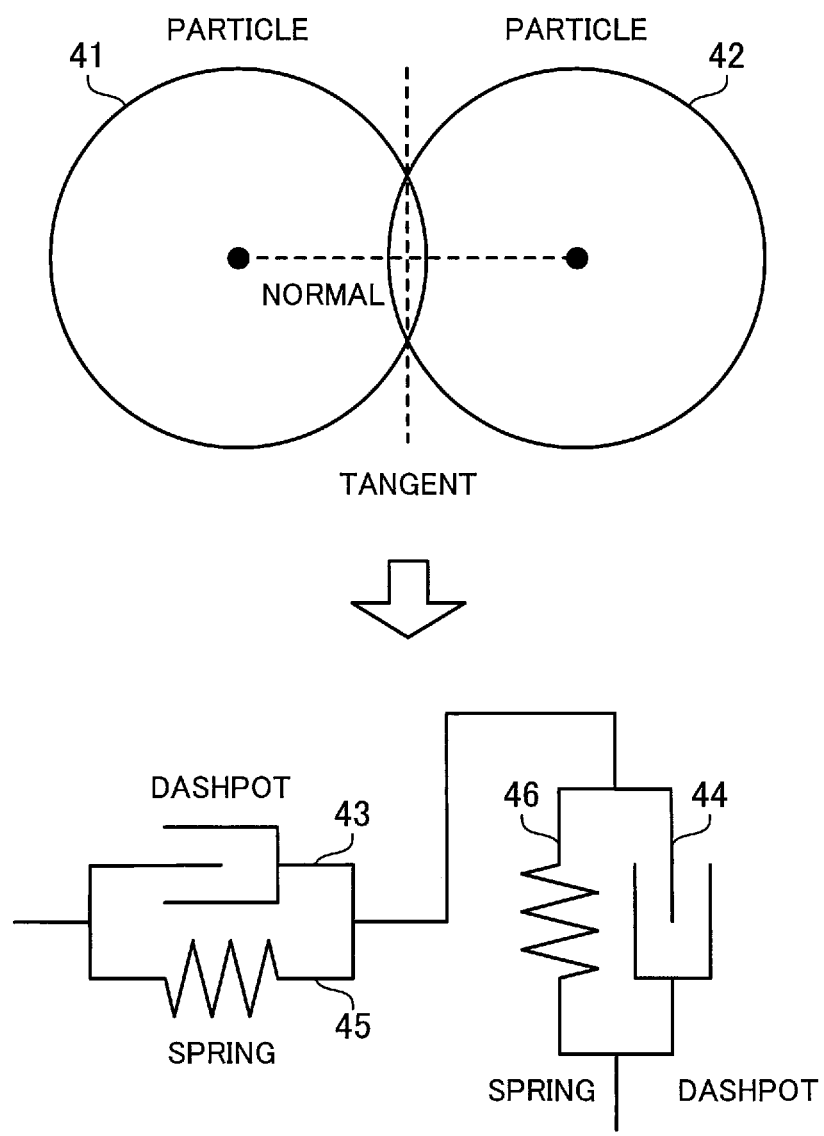
FIG. 4 illustrates an exemplary particle model in a DEM scheme.

FIG. 4 illustrates an exemplary particle model in the DEM scheme.

The DEM scheme involves the following steps of calculation: calculation of the net force acting on a target particle; calculation of the acceleration of the target particle based on the calculated net force and the mass of the target particle; calculation of the velocity for the next time step based on the calculated acceleration and the current velocity; and calculation of the position for the next time step based on the calculated velocity for the next time step and the current position. The net force acting on the target particle is calculated as the sum of external forces, such as gravity, and contact forces exerted by one or more neighboring particles in contact (contact particles) with the target particle. Therefore, the DEM scheme uses a model representing contact forces between particles.

Let us here consider the case where particles 41 and 42 are in contact with each other. The position of the particle 41 is given by the coordinates of the center of the particle 41. Similarly, the position of the particle 42 is given by the coordinates of the center of the particle 42. The radius of the particle 41 may be the same or different from that of the particle 42. To simplify the simulation, all the particles may be assumed to have the same radius. When the particles 41 and 42 strongly collide with each other, they may penetrate each other in an overlap area. In view of this, if the distance between the center of the particle 41 and the center of the particle 42 is less than or equal to the sum of the radii of the particles 41 and 42, the particles 41 and 42 are determined to be in contact with each other.

When the particles 41 and 42 are in contact, the contact force on the particle 41 exerted by the particle 42 is decomposed into the normal and tangential components. The normal contact force is modelled by a dashpot 43 and a spring 45 arranged in parallel. The tangential contact force is modelled by a dashpot 44 and a spring 46 arranged in parallel. Each of the dashpots 43 and 44 is an element for offering viscous resistance proportional to the velocity in the opposite direction of the positive velocity. The higher the velocity, the larger the viscous resistance, and the lower the velocity, the smaller the viscous resistance. Each of the springs 45 and 46 is an element for offering elastic resistance proportional to the displacement from the original spring length in the opposite direction of the displacement. The larger the displacement, the larger the elastic resistance, and the smaller the displacement, the smaller the elastic resistance.

The normal contact force is the sum of the viscous resistance of the dashpot 43 and the elastic resistance of the spring 45. Therefore, a normal contact force $F_N(t)$ at time step t (t is an integer greater than or equal to 1) is given by Equation (1) below, where $k_N$ is an elastic modulus of the spring 45 and cm is a viscous damping coefficient of the dashpot 43. The elastic modulus $k_H$ and the viscous damping coefficient $c_N$ are given as input data. The elastic modulus $k_N$ and the viscous damping coefficient cm may be the same for all particles or different for different particles. $D_N(t)$ is the displacement in the normal direction at time step t, and $\Delta D_N(t)$ is the normal component of the relative velocity of the particle 41 with respect to the particle 42 at time step t.

$$F_N(t) = k_N D_N(t) + c_N \Delta D_N(t) \quad (1)$$

The displacement $D_N(t)$ corresponds to the depth of penetration between the particles 41 and 42. Therefore, the displacement $D_N(t)$ is calculated by subtracting the distance between the centers of the particles 41 and 42 from the sum of the radii of the particles 41 and 42. The relative velocity $\Delta D_N(t)$ is calculated from the velocities of the particles 41 and 42.

The tangential contact force is the sum of the viscous resistance of the dashpot 44 and the elastic resistance of the spring 46. Therefore, a tangential contact force $F_T(t)$ at time step t is given by Equation (2) below, where $k_T$ is an elastic modulus of the spring 46 and $c_T$ is a viscous damping coefficient of the dashpot 44. The elastic modulus $k_T$ and the viscous damping coefficient $c_T$ are given as input data. The elastic modulus $k_T$ and the viscous damping coefficient $c_T$ may be the same for all particles or different for different particles. $D_T(t)$ is the displacement in the tangential direction at time step t, and $\Delta D_T(t)$ is the tangential component of the relative velocity of the particle 41 with respect to the particle 42 at time step t.

$$F_T(t) = k_T D_T(t) + c_T \Delta D_T(t) \tag{2}$$

The displacement $D_T(t)$ is the cumulative travel distance in the tangential direction made while the particles 41 and 42 remain in contact after the contact is formed. Because the relative velocity of the particle 41 with respect to the particle 42 may change every time step, the displacement $D_T(t)$ is obtained by calculating the travel distance in the tangential direction over each unit time step $\Delta t$ (a duration corresponding to one time step) from the time the contact is formed to the time the contact breaks and adding up the incremental travel distances in the tangential direction. The relative velocity $\Delta D_T(t)$ is calculated from the velocities of the particles 41 and 42.

The aforementioned normal and tangential contact forces are then combined to obtain the contact force on the particle 41 exerted by the particle 42. If the particle 41 is in contact with yet another particle, the contact force on the particle 41 exerted by the different particle is also calculated. The contact forces on the particle 41 exerted by the one or more contact particles are combined with external forces, such as gravity, to thereby compute the net force acting on the particle 41.

As mentioned above, the displacement in the normal direction $D_N(t)$ is calculated from the positions of the particles 41 and 42 at time step t. The normal component of the relative velocity $\Delta D_N(t)$ is calculated from the velocities of the particles 41 and 42 at time step t. The tangential component of the relative velocity $\Delta D_T(t)$ is also calculated from the velocities of the particles 41 and 42 at time step t. Therefore, the displacement $D_N(t)$ and the relative velocities $\Delta D_N(t)$ and $\Delta D_T(t)$ are calculated from the states of the particles 41 and 42 at time step t and thus independent from the states of the particles 41 and 42 at the previous time step.

On the other hand, the displacement in the tangential direction $D_T(t)$ is calculated by adding the travel distance in the tangential direction between time steps t−1 and t to a displacement $D_T(t-1)$ at time step t−1. Therefore, the displacement $D_T(t)$ is dependent on not only the states of the particles 41 and 42 at time step t but also the states of the particles 41 and 42 at the previous time step. In view of this, the displacement in the tangential direction is retained as the states of the particles 41 and 42 during the particle 41 being in contact with the particle 42. Thus, the DEM scheme involves, for the target particle, copying of the displacement in the tangential direction of each particle in contact with the target particle from the previous time step to the current time step.

Figure 5:
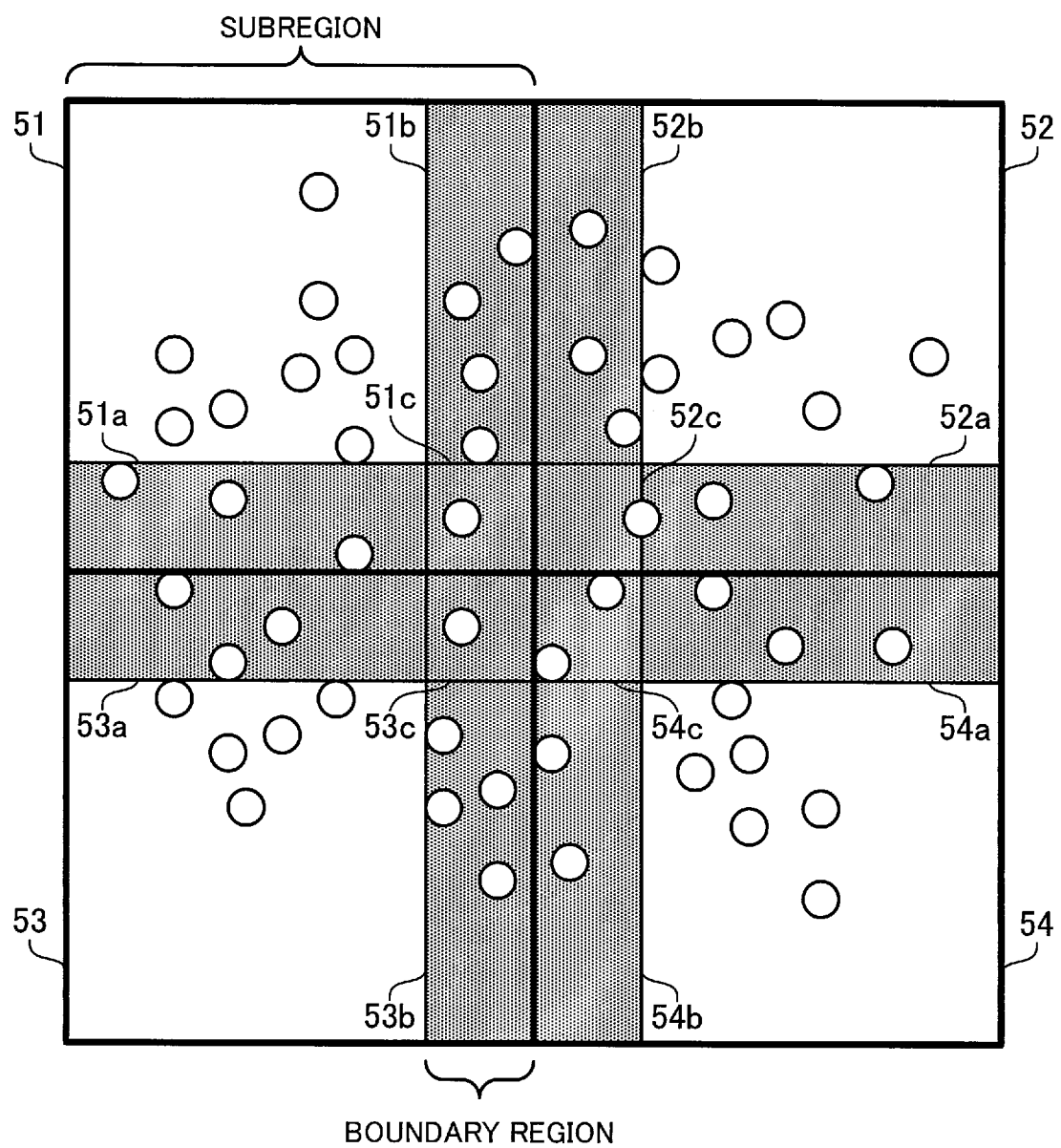
FIG. 5 illustrates exemplary division of a simulation region.

FIG. 5 illustrates exemplary division of a simulation region.

The entire simulation region is divided, for example, into subregions 51, 52, 53, and 54. Each of the subregions 51, 52, 53, and 54 is a square. The subregion 51 is located in the upper left of the entire region; the subregion 52, in the upper right; the subregion 53, in the lower left; and the subregion 54, in the lower right. Therefore, the subregion 51 is bordered on the right side by the subregion 52; on the lower side by the subregion 53; and at the bottom right point by the subregion 54. The subregion 52 is bordered on the left side by the subregion 51; at the bottom left point by the subregion 53; and on the lower side by the subregion 54. The subregion 53 is bordered on the upper side by the subregion 51; at the top right point by the subregion 52; and on the right side by the subregion 54. The subregion 54 is bordered at the top left point by the subregion 51; on the upper side by the subregion 52; and on the left side by the subregion 53.

The subregion 51 is assigned to the calculation node 100. The subregion 52 is assigned to the calculation node 100-1. The subregion 53 is assigned to the calculation node 100-2. The subregion 54 is assigned to the calculation node 100-3.

The subregion 51 includes boundary regions 51a, 51b, and 51c, each of which is a set of points within a predetermined distance from the border of the subregion 51 with another or other subregions. The boundary region 51c is a set of points within a predetermined distance from the lower boundary of the subregion 51 and a predetermined distance from the right boundary. The boundary region 51a is a set of points within a predetermined distance from the lower boundary of the subregion 51, except for the points of the boundary region 51c. The boundary region 51b is a set of points within a predetermined distance from the right boundary of the subregion 51, except for the points of the boundary region 51c.

The subregion 52 includes boundary regions 52a, 52b, and 52c, each of which is a set of points within a predetermined distance from the border of the subregion 52 with another or other subregions. The boundary region 52c is a set of points within a predetermined distance from the lower boundary of the subregion 52 and a predetermined distance from the left boundary. The boundary region 52a is a set of points within a predetermined distance from the lower boundary of the subregion 52, except for the points of the boundary region 52c. The boundary region 52b is a set of points within a predetermined distance from the left boundary of the subregion 52, except for the points of the boundary region 52c.

The subregion 53 includes boundary regions 53a, 53b, and 53c, each of which is a set of points within a predetermined distance from the border of the subregion 53 with another or other subregions. The boundary region 53c is a set of points within a predetermined distance from the upper boundary of the subregion 53 and a predetermined distance from the right boundary. The boundary region 53a is a set of points within a predetermined distance from the upper boundary of the subregion 53, except for the points of the boundary region 53c. The boundary region 53b is a set of points within a predetermined distance from the right boundary of the subregion 53, except for the points of the boundary region 53c.

The subregion 54 includes boundary regions 54a, 54b, and 54c, each of which is a set of points within a predetermined distance from the border of the subregion 54 with another or other subregions. The boundary region 54c is a set of points within a predetermined distance from the upper boundary of the subregion 54 and a predetermined distance from the left boundary. The boundary region 54a is a set of points within a predetermined distance from the upper boundary of the subregion 54, except for the points of the boundary region 54c. The boundary region 54b is a set of points within a predetermined distance from the left boundary of the subregion 54, except for the points of the boundary region 54c.

As described above, a particle belonging to one subregion may come into contact with a different particle belonging to another subregion across the boundary of the two subregions. In view of this, the calculation nodes 100, 100-1, 100-2, and 100-3 share particle data of particles belonging to the boundary regions.

Specifically, the calculation node 100 transmits particle data associated with the boundary regions 51b and 51c to the calculation node 100-1; particle data associated with the boundary regions 51a and 51c to the calculation node 100-2; and particle data associated with the boundary region 51c to the calculation node 100-3. The calculation node 100-1 transmits particle data associated with the boundary regions 52b and 52c to the calculation node 100; particle data associated with the boundary region 52c to the calculation node 100-2; and particle data associated with the boundary regions 52a and 52c to the calculation node 100-3. The calculation node 100-2 transmits particle data associated with the boundary regions 53a and 53c to the calculation node 100; particle data associated with the boundary region 53c to the calculation node 100-1; and particle data associated with the boundary regions 53b and 53c to the calculation node 100-3. The calculation node 100-3 transmits particle data associated with the boundary region 54c to the calculation node 100; particle data associated with the boundary regions 54a and 54c to the calculation node 100-1; and particle data associated with the boundary regions 54b and 54c to the calculation node 100-2.

Herewith, the calculation node 100 in charge of the subregion 51 has the particle data of particles belonging to the boundary regions 52b, 52c, 53a, 53c, and 54c, in addition to particle data of particles belonging to the subregion 51. The calculation node 100 determines, with respect to each particle belonging to the subregion 51, contact particles and then calculates the position and velocity. From the point of view of the calculation node 100, the subregion 51 is hereinafter sometimes referred to as "main region" and the boundary regions 52b, 52c, 53a, 53c, and 54c together are sometimes collectively referred to as "skirt region".

Similarly, the calculation node 100-1 in charge of the subregion 52 has the particle data of particles belonging to the boundary regions 51b, 51c, 53c, 54a, and 54c, in addition to particle data of particles belonging to the subregion 52. The calculation node 100-1 determines, with respect to each particle belonging to the subregion 52, contact particles and then calculates the position and velocity. From the point of view of the calculation node 100-1, the subregion 52 is hereinafter sometimes referred to as "main region" and the boundary regions 51b, 51c, 53c, 54a, and 54c together are sometimes collectively referred to as "skirt region".

The calculation node 100-2 in charge of the subregion 53 has the particle data of particles belonging to the boundary regions 51a, 51c, 52c, 54b, and 54c, in addition to particle data of particles belonging to the subregion 53. The calculation node 100-2 determines, with respect to each particle belonging to the subregion 53, contact particles and then calculates the position and velocity. From the point of view of the calculation node 100-2, the subregion 53 is hereinafter sometimes referred to as "main region" and the boundary regions 51a, 51c, 52c, 54b, and 54c together are sometimes collectively referred to as "skirt region".

The calculation node 100-3 in charge of the subregion 54 has the particle data of particles belonging to the boundary regions 51c, 52a, 52c, 53b, and 53c, in addition to particle data of particles belonging to the subregion 54. The calculation node 100-3 determines, with respect to each particle belonging to the subregion 54, contact particles and then calculates the position and velocity. From the point of view of the calculation node 100-3, the subregion 54 is hereinafter sometimes referred to as "main region" and the boundary regions 51c, 52a, 52c, 53b, and 53c together are sometimes collectively referred to as "skirt region".

In addition, as described above, particles belonging to subregions may move to different subregions when the simulation advances by one time step. Note that a subregion to which each particle belongs is determined by the coordinates of the center of the particle. The calculation nodes 100, 100-1, 100-2, and 100-3 mutually exchange particle data of particles having moved out of their assigned subregions.

Specifically, the calculation node 100 transmits, to the calculation node 100-1, particle data of particles having left the subregion 51 from the right boundary; to the calculation node 100-2, particle data of particles having left from the lower boundary; and to the calculation node 100-3, particle data of particles having left from the bottom right point. The calculation node 100-1 transmits, to the calculation node 100, particle data of particles having left the subregion 52 from the left boundary; to the calculation node 100-2, particle data of particles having left from the bottom right point; and to the calculation node 100-3, particle data of particles having left from the lower boundary. The calculation node 100-2 transmits, to the calculation node 100, particle data of particles having left the subregion 53 from the upper boundary; to the calculation node 100-1, particle data of particles having left from the top right point; and to the calculation node 100-3, particle data of particles having left from the right boundary. The calculation node 100-3 transmits, to the calculation node 100, particle data of particles having left the subregion 54 from the top left point; to the calculation node 100-1, particle data of particles having left from the upper boundary; and to the calculation node 100-2, particle data of particles having left from the left boundary.

Figure 6:
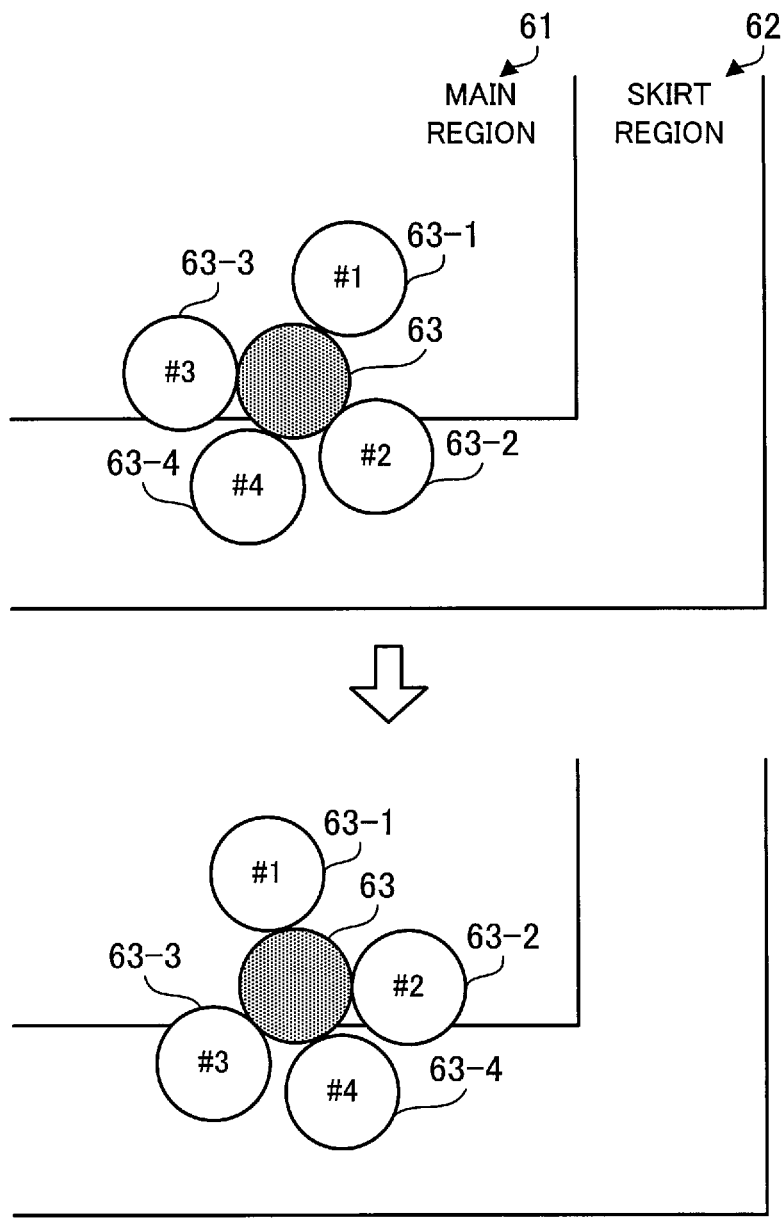
FIG. 6 is a first diagram illustrating exemplary movements of neighboring particles.

FIG. 6 is a first diagram illustrating exemplary movements of neighboring particles.

A main region 61 corresponds to the subregion 51 of FIG. 5. A skirt region 62 corresponds to a set of the boundary regions 52b, 52c, 53a, 53c, and 54c of FIG. 5. Focusing on one particle belonging to the main region 61, neighboring particles existing around the target particle are classified into four states according to whether each of them belongs to the main region 61 or the skirt region 62 and whether or not it is in contact with the target particle. Then, the movements of the neighboring particles are classified into sixteen patterns according to the combination of the states at the previous time step and the current time step. FIG. 6 depicts four of the sixteen patterns.

A particle 63 is a target particle in the main region 61. Particles 63-1 to 63-4 are neighboring particles existing around the particle 63. At the previous time step, the particles 63-1 and 63-3 belong to the main region 61 and are in contact with the particle 63. The particles 63-2 and 63-4 belong to the skirt region 62 and are in contact with the particle 63. At the current time step, the particle 63-1 belongs to the main region 61 and are in contact with the particle 63. The particle 63-2 has moved into the main region 61 from the skirt region 62 and is in contact with the particle 63. The particle 63-3 has moved into the skirt region 62 from the main region 61 and is in contact with the particle 63. The particle 63-4 belongs to the skirt region 62 and is in contact with the particle 63.

The particles 63-1 to 63-4 described above are in contact with the particle 63 at both the previous and current time steps. Therefore, in calculating the net force acting on the particle 63, the displacement in the tangential direction of each of the particles 63-1 to 63-4 is copied from the previous time step to the current time step.

Figure 7:
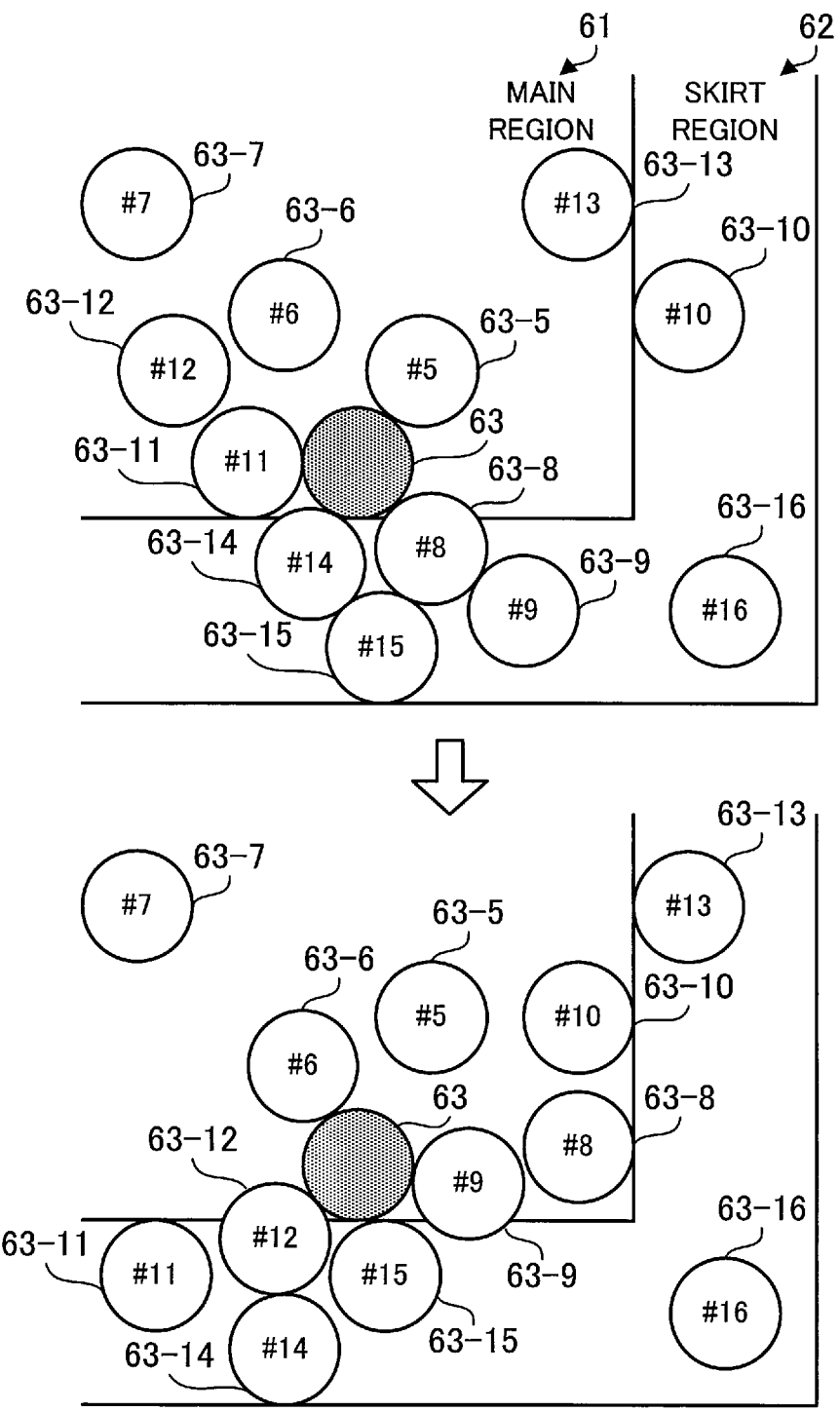
FIG. 7 is a second diagram illustrating exemplary movements of neighboring particles.

FIG. 7 is a second diagram illustrating exemplary movements of neighboring particles.

FIG. 7 depicts the remaining twelve of the aforementioned sixteen patterns. Particles 63-5 to 63-16 are neighboring particles existing around the particle 63.

At the previous time step, the particles 63-5 and 63-11 belong to the main region 61 and are in contact with the particle 63. The particles 63-6, 63-7, 63-12, and 63-13 belong to the main region 61 and are not in contact with the particle 63. The particles 63-8 and 63-14 belong to the skirt region 62 and are in contact with the particle 63. The particles 63-9, 63-10, 63-15, and 63-16 belong to the skirt region 62 and are not in contact with the particle 63.

At the current time step, the particle 63-5 belongs to the main region 61 and has moved out of contact with the particle 63. The particle 63-6 belongs to the main region 61 and is in contact with the particle 63. The particle 63-7 belongs to the main region 61 and is not in contact with the particle 63. The particle 63-8 has moved into the main region 61 from the skirt region 62 and moved out of contact with the particle 63.

The particle 63-9 has moved into the main region 61 from the skirt region 62 and is in contact with the particle 63. The particle 63-10 has moved into the main region 61 from the skirt region 62 and is not in contact with the particle 63. The particle 63-11 has moved into the skirt region 62 from the main region 61 and moved out of contact with the particle 63. The particle 63-12 has moved into the skirt region 62 from the main region 61 and is in contact with the particle 63.

The particle 63-13 has moved into the skirt region 62 from the main region 61 and is not in contact with the particle 63. The particle 63-14 belongs to the skirt region 62 and has moved out of contact with the particle 63. The particle 63-15 belongs to the skirt region 62 and is in contact with the particle 63. The particle 63-16 belongs to the skirt region 62 and is not in contact with the particle 63.

The particles 63-5 to 63-16 described above are not in contact with the particle 63 at at least one of the previous and current time steps. Therefore, the calculation of the net force acting on the particle 63 does not involve copying of the displacements in the tangential direction of these particles 63-5 to 63-16.

Figure 8:
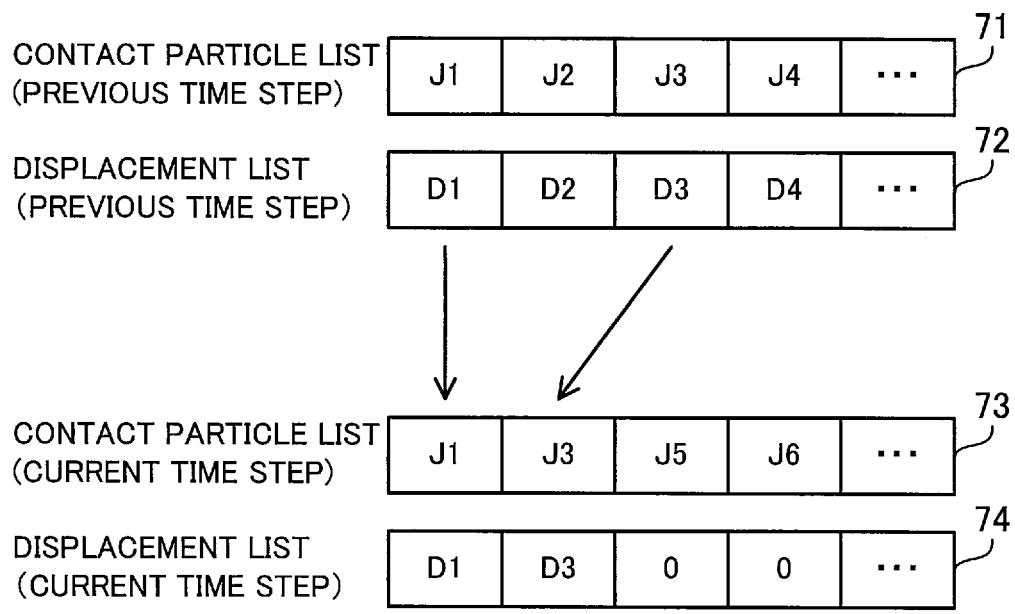
FIG. 8 illustrates exemplary copying of displacements in a tangential direction.

FIG. 8 illustrates exemplary copying of displacements in a tangential direction.

Let us here look at a relatively simple method of copying displacements in the tangential direction.

For one particle (target particle) in the main region, a contact particle list 71 and a displacement list 72 of the previous time step are generated. The contact particle list 71 is data enumerating particle numbers of contact particles in contact with the target particle at the previous time step. The contact particles individually belong to the main region or the skirt region. The displacement list 72 is data enumerating displacements in the tangential direction, mapped to the particle numbers registered in the contact particle list 71. Each displacement in the displacement list 72 is a displacement of a contact particle indicated by the corresponding particle number, made up to the previous time step.

When the simulation advances by one time step, i.e., the time on the simulation clock advances by one unit time step, a contact particle list 73 and a displacement list 74 of the current time step are generated for the same particle above. The contact particle list 73 is data enumerating particle numbers of contact particles in contact with the target particle at the current time step. The displacement list 74 is data enumerating displacements in the tangential direction, mapped to the particle numbers registered in the contact particle list 73. Each displacement in the displacement list 74 is a displacement of a contact particle indicated by the corresponding particle number, made up to the current time step.

Upon completion of generating the contact particle list 73 and the displacement list 74 at the current time step, the contact particle list 71 and the displacement list 72 of the previous time step may be deleted. Note however that in the case where there are individual contact particles registered in both the contact particle lists 71 and 73, the displacements corresponding to these contact particles are copied from the displacement list 72 to the displacement list 74. In this manner, copying of the displacements up to the previous time step is done at the start of the current time step.

Then, to each of the copied displacements, a relative travel distance in the tangential direction (incremental displacement) made between the previous time step and the current time step is added, to thereby obtain a displacement of the corresponding contact particle up to the current time step. The incremental displacement in the tangential direction is calculated, for example, by subtracting the product of the tangential component of the velocity of the contact particle at the current time step and the unit time step from the product of the tangential component of the velocity of the target particle at the current time step and the unit time step.

The following is one method of copying the displacements in the tangential direction. First, irrespective of the contact particle list 71 of the previous time step, contact particles at the current time step are detected by examining, for each particle belonging to the main or skirt region, whether it is in contact with the target particle. Herewith, the contact particle list 73 of the current time step is generated.

With the generation of the contact particle list 73, the contact particle list 71 is scanned for each contact particle registered in the contact particle list 73, to find the same contact particle in the contact particle list 71. As the same contact particle is detected in the contact particle list 71, the displacement is read from a location, within the displacement list 72, corresponding to the location of the contact particle detected in the contact particle list 71. Then, the read displacement is copied to a location, within the displacement list 74, corresponding to the location of the contact particle registered in the contact particle list 73. On the other hand, if the same contact particle is not included in the contact particle list 71, a displacement of 0 is written to the location, within the displacement list 74, corresponding to the location of the contact particle registered in the contact particle list 73.

For example, when the first element of the contact particle list 73 represents the same contact particle as the first element of the contact particle list 71, the first element of the displacement list 72 is copied to be the first element of the displacement list 74. In addition, when the second element of the contact particle list 73 represents the same contact particle as the third element of the contact particle list 71, the third element of the displacement list 72 is copied to be the second element of the displacement list 74. If the contact particle list 71 does not include elements representing the same contact particles as the third and fourth elements of the contact particle list 73, the displacements of the third and fourth elements of the displacement list 74 are set to 0.

In the displacement copying method described above, the computational cost for the comparison task where particle numbers are compared between the contact particle lists 71 and 73 is $O(N^2)$ where N is the average number of contact particles likely to be registered in the contact particle lists 71 and 73. Performing such a comparison task for each particle belonging to the main region each time the simulation advances by one time step is computationally intensive. In view of this, the calculation nodes 100, 100-1, 100-2, and 100-3 of the second embodiment improve an algorithm for generating the contact particle list 73 of the current time step in such a manner as to reduce computational complexity in the comparison task. A method of generating the contact particle list 73 of the current time step is described later in detail.

Note that the particle numbers included in the contact particle lists 71 and 73 are locally unique identification numbers on one calculation node. For example, the calculation node 100 assigns particle numbers to particles belonging to the main and skirt regions of the calculation node 100, separately from the calculation nodes 100-1, 100-2, and 100-3. When particles move in and out between subregions, different particle numbers may be assigned to the same particle in the previous time step and in the current time step. Note however that the calculation node 100 comprehends, for each particle remaining in the main region, the mapping between the particle numbers of the previous and current time steps. In addition, according to the second embodiment, global identifiers (IDs) are also used as identification numbers of particles in addition to the particle numbers. The global IDs are globally unique identification numbers for all the calculation nodes.

Next described are functions of the calculation node 100.

Figure 9:
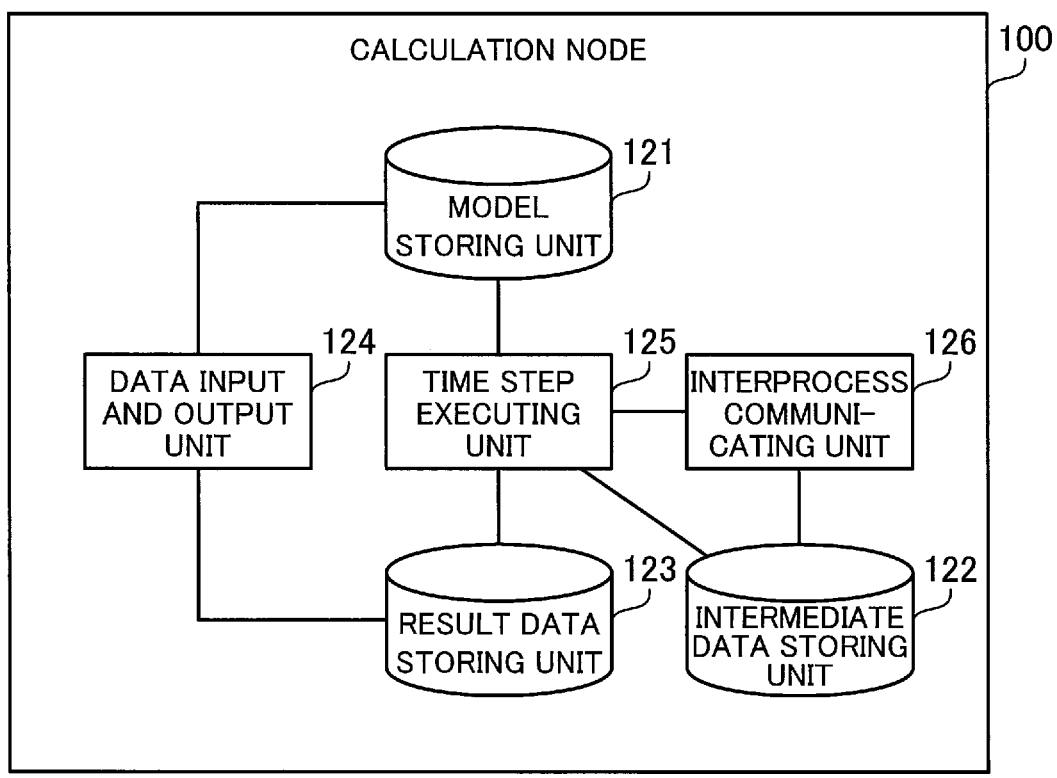
FIG. 9 is a block diagram illustrating exemplary functions of the calculation node.

FIG. 9 is a block diagram illustrating exemplary functions of the calculation node.

The calculation node 100 includes a model storing unit 121, an intermediate data storing unit 122, a result data storing unit 123, a data input and output unit 124, a time step executing unit 125, and an interprocess communicating unit 126. The model storing unit 121, the intermediate data storing unit 122, and the result data storing unit 123 are implemented using a storage area secured, for example, in the RAM 102 or the HDD 103. The data input and output unit 124, the time step executing unit 125, and the interprocess communicating unit 126 are implemented, for example, using programs executed by the CPU 101. Note that the calculation nodes 100-1, 100-2, and 100-3 also individually have the same modules as those found in the calculation node 100.

The model storing unit 121 stores therein input data representing a model of the subregion assigned to the calculation node 100. The input data includes region data such as size and coordinates of the subregion and the positions of walls. In addition, the input data includes the positions of particles initially distributed in the subregion. The input data also includes physical parameters such as gravity, radii of the particles, and elastic modulus and viscous damping coefficient of the contact model. Further, the input data includes control parameters such as unit time step duration and maximum time step number.

The intermediate data storing unit 122 stores therein intermediate data generated during the simulation. The intermediate data includes particle data indicating positions and velocities of particles belonging to the main region, and particle data indicating positions and velocities of particles belonging to the skirt region. In addition, the intermediate data includes information mapping between particle numbers of the previous time step and those of the current time step. The intermediate data further includes the contact particle list and displacement list of each particle belonging to the main region.

The result data storing unit 123 stores therein result data indicating results of the simulation for the subregion assigned to the calculation node 100. The result data includes information representing, for each time step, particles existing in the subregion and their locations at the time step. Tracking the positions of each particle in chronological order allows visualization of the motion of powder particles.

The data input and output unit 124 communicates with the management node 200 that controls parallel processing. Specifically, the data input and output unit 124 receives, from the management node 200, the input data of the subregion assigned to the calculation node 100 and then stores it in the model storing unit 121. In addition, when the simulation time reaches the maximum time step number, the data input and output unit 124 reads result data from the result data storing unit 123 and transmits it to the management node 200. The management node 200 then aggregates result data of a plurality of subregions and visualizes the motion of powder particles over the entire region.

The time step executing unit 125 calculates, using the input data stored in the model storing unit 121, the motion of particles in the assigned subregion time step by time step along the time axis. Advancing the simulation by one time step corresponds to advancing the time on the simulation clock by a predetermined very short period of time. Each time step includes the following procedure of calculation for each particle belonging to the subregion: examining contact particles and calculating contact forces exerted by the contact particles; calculating the net force by combining the contact forces and gravity; and calculating, based on the current position and velocity and the net force, the position and velocity for the next time step. The time step executing unit 125 updates accordingly the intermediate data stored in the intermediate data storing unit 122. In addition, the time step executing unit 125 writes the positions of particles at each time step into the result data storing unit 123.

The interprocess communicating unit 126 implements interprocess communication between a process executed by the time step executing unit 125 of the calculation node 100 and processes individually executed by the calculation nodes 100-1, 100-2, and 100-3. Specifically, the interprocess communicating unit 126 reads some intermediate data from the intermediate data storing unit 122 and transmits it to the calculation nodes 100-1, 100-2, and 100-3. In addition, the interprocess communicating unit 126 receives intermediate data from the calculation nodes 100-1, 100-2, and 100-3 and stores it in the intermediate data storing unit 122.

The intermediate data to be transmitted to the calculation nodes 100-1, 100-2, and 100-3 includes particle data of particles having moved out from the subregion assigned to the calculation node 100. In addition, the intermediate data to be transmitted includes particle data of particles in the boundary regions which correspond to skirt regions of the calculation nodes 100-1, 100-2, and 100-3. On the other hand, the intermediate data received from the calculation nodes 100-1, 100-2, and 100-3 includes particle data of particles having moved into the subregion assigned to the calculation node 100. In addition, the received intermediate data includes particle data of particles in boundary regions which correspond to the skirt region of the calculation node 100.

FIG. 10 illustrates an exemplary result table.

A result table 131 is stored in the result data storing unit 123. The result table 131 includes columns named TIME STEP NUMBER (NO.); GLOBAL ID; and POSITION. The rows under TIME STEP NO. contain one or more integers for identifying time steps. An entry of "1" under TIME STEP NO. corresponds to the initial state at the start of simulation. The rows under GLOBAL ID contain globally unique identification numbers, each of which uniquely identifies a particle across all particles in the simulation region. The rows under POSITION contain coordinates representing positions of the corresponding particles. Note that the input data provided includes, as information about initial distribution of particles, entries under GLOBAL ID and POSITION which correspond to entries of "1" under TIME STEP NO.

Figure 11:
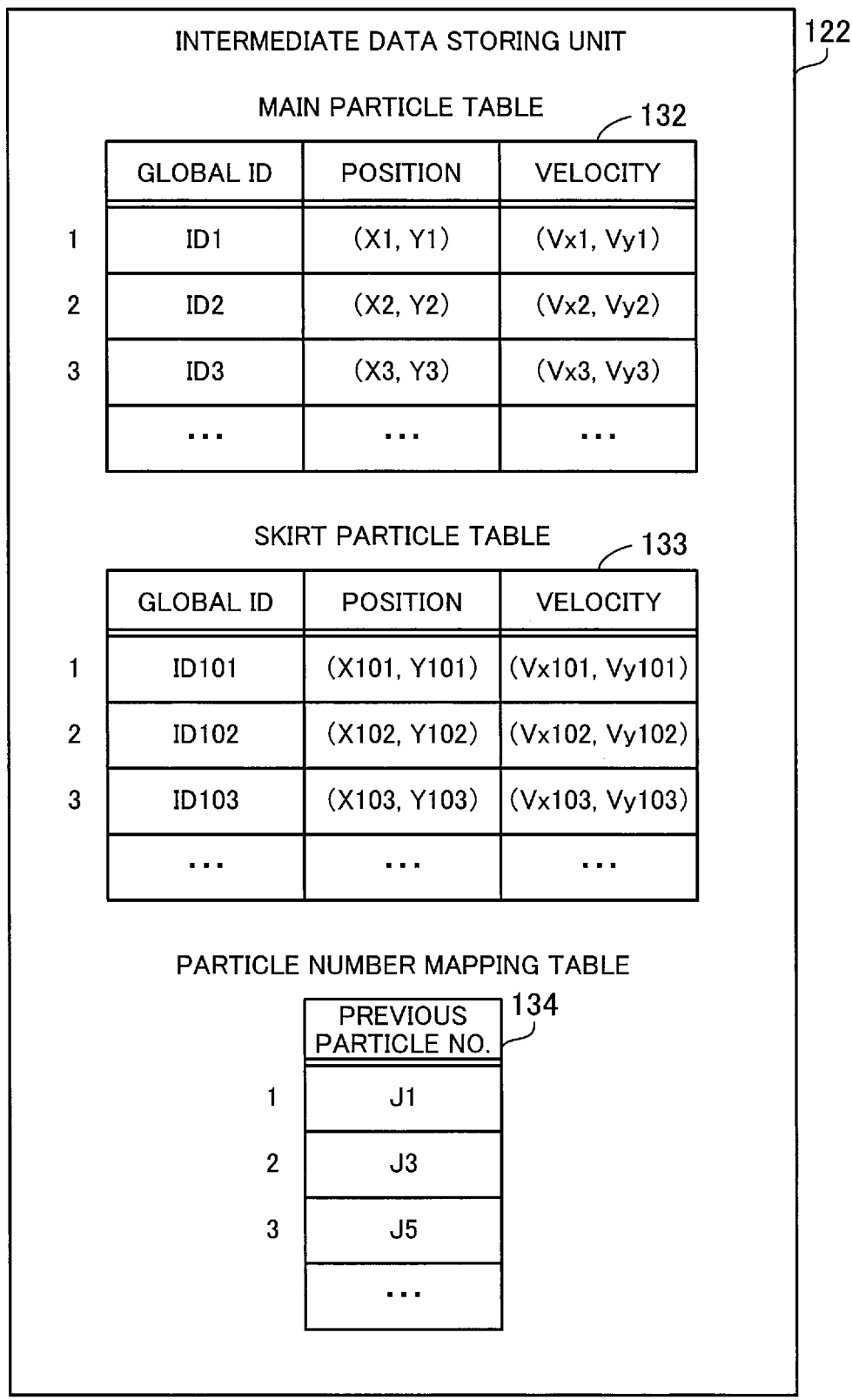
FIG. 11 illustrates exemplary particle tables and particle number mapping table.

FIG. 11 illustrates exemplary particle tables and particle number mapping table.

A main particle table 132 is stored in the intermediate data storing unit 122. The main particle table 132 contains the latest particle data of particles belonging to the main region. The main particle table 132 includes columns named GLOBAL ID; POSITION; and VELOCITY. The rows under GLOBAL ID contain global IDs assigned to the particles belonging to the main region. The rows under POSITION contain coordinates representing positions of the particles belonging to the main region. The rows under VELOCITY contain velocity vectors of the particles belonging to the main region. When the simulation region is two dimensional, the coordinates and velocity vectors are two dimensional vectors.

Indices indicating the order of records in the main particle table 132 are used as the particle numbers of the particles belonging to the main region. For example, a particle indicated by the first record of the main particle table 132 has a particle number of 1. When a particle moves out of the main region, a record corresponding to the particle is deleted from the main particle table 132. When a particle moves into the main region, a record corresponding to the particle is inserted into the main particle table 132. Therefore, when the simulation advances by one time step, indices assigned to existing records may change, resulting in changes to the particle numbers of existing particles.

Note that the main particle table 132 may be organized as a multidimensional array. Alternatively, the main particle table 132 may be organized as three one-dimensional arrays composed of a global ID array, a position array, and a velocity array. The indices correspond to subscripts in the array or arrays. When the main particle table 132 is organized as three one-dimensional arrays, a global ID, position, and velocity denoted by the same index are mapped to each other as information on the same particle.

A skirt particle table 133 is stored in the intermediate data storing unit 122. The skirt particle table 133 contains the latest particle data of particles belonging to the skirt region. The skirt particle table 133 includes columns named GLOBAL ID; POSITION; and VELOCITY. The rows under GLOBAL ID contain global IDs assigned to the particles belonging to the skirt region. The rows under POSITION contain coordinates representing positions of the particles belonging to the skirt region. The rows under VELOCITY contain velocity vectors of the particles belonging to the skirt region.

A predetermined prefix is added to each of indices indicating the order of records in the skirt particle table 133, and the resultant indices are used as particle numbers of the particles belonging to the skirt region. The prefix is given such that the resultant particle numbers do not conflict with the particle numbers of the particles belonging to the main region. For example, a particle indicated by the first record in the skirt particle table 133 has a particle number of 900001. The particle data of the skirt particle table 133 is compilation of that received from the calculation nodes 100-1, 100-2, and 100-3.

Note that the skirt particle table 133 may be organized as a multidimensional array. Alternatively, the skirt particle table 133 may be organized as three one-dimensional arrays composed of a global ID array, a position array, and a velocity array. The indices correspond to subscripts in the array or arrays. When the skirt particle table 133 is organized as three one-dimensional arrays, a global ID, position, and velocity denoted by the same index are mapped to each other as information on the same particle.

The positions and velocities in the main particle table 132 are subject to updates by the calculation node 100. In addition, the records registered in the main particle table 132 may be retained for the next time step. On the other hand, the positions and velocities in the skirt particle table 133, which are calculated by the calculation nodes 100-1, 100-2, and 100-3, are not updated by the calculation node 100. In addition, the records registered in the skirt particle table 133 are reset every time step and not retained for the next time step. The calculation node 100 may generate, every time step, a new skirt particle table 133 by putting together particle data of the skirt region received from the calculation nodes 100-1, 100-2, and 100-3.

The particle number mapping table 134 is stored in the intermediate data storing unit 122. The particle number mapping table 134 maps, for each particle belonging to the main region at the previous time step and remaining in the main region at the current time step, the particle number of the previous time step (termed "previous particle number") to that of the current time step. The particle number mapping table 134 is a one-dimensional array of the previous particle numbers. Indices of the particle number mapping table 134 correspond to the particle numbers of the current time step.

One index and a previous particle number denoted by this index represent the particle number of the current time step and that of the previous time step, respectively, of the same particle. For example, when the second record of the particle number mapping table 134 indicates a previous particle number of 3, a particle whose particle number of the previous time step is 3 is the same as a particle whose particle number of the current time step is 2. The particle number mapping table 134 may be formed such as to allow fast retrieval of particle numbers of the current time step based on the previous particle numbers.

Note that the calculation node 100 generates the particle number mapping table 134 when reflecting, in the main particle table 132, particles having moved in and out of the main region. Because the calculation node 100 handles insertion and deletion of records in the main particle table 132, it comprehends changes in the particle numbers of the particles remaining in the main region. On the other hand, because the calculation node 100 resets the skirt particle table 133 every time step, it has no grasp of changes in the particle numbers of particles remaining in the skirt region and those having moved between the main region and the skirt region.

Figure 12:
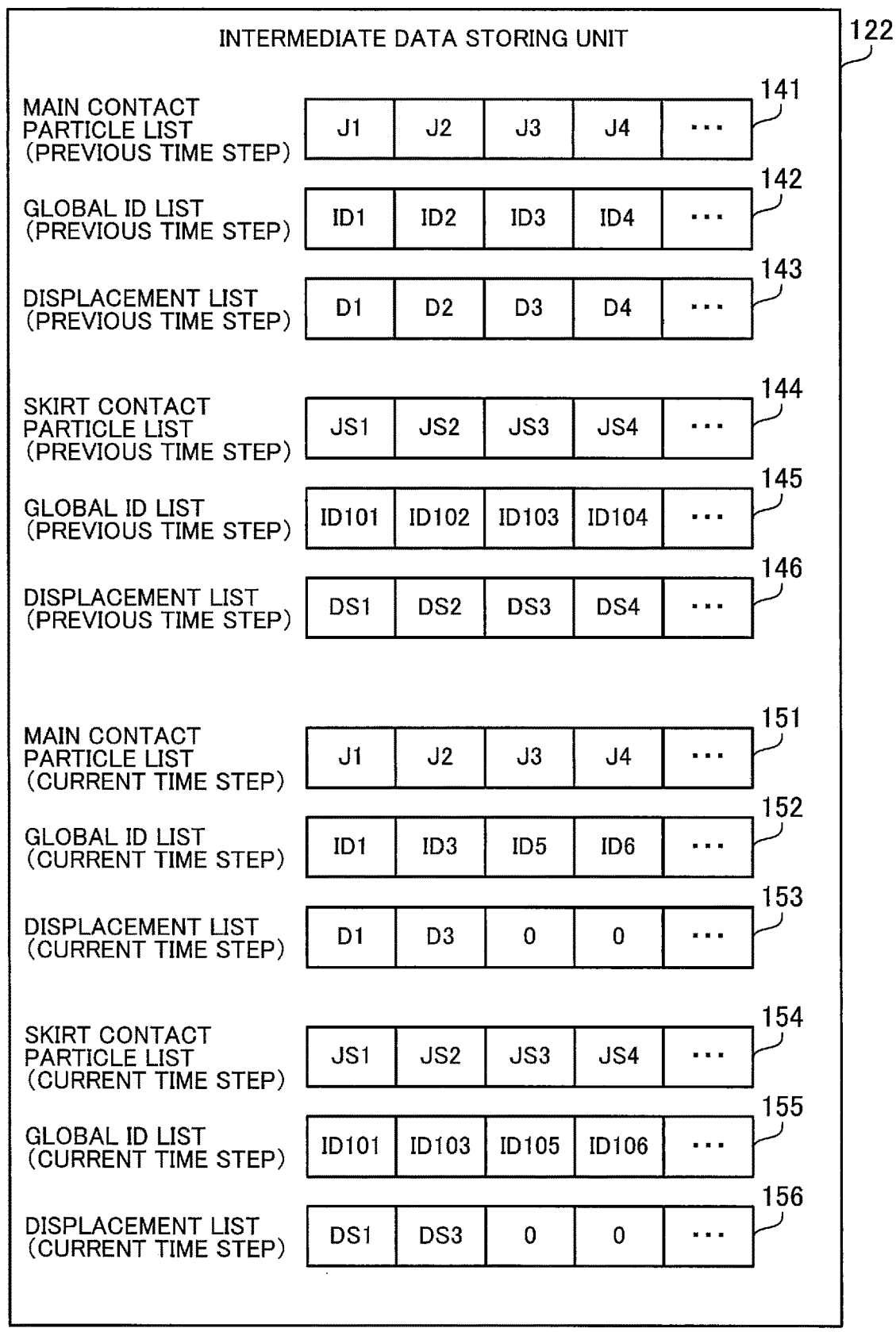
FIG. 12 illustrates exemplary contact particle lists.

FIG. 12 illustrates exemplary contact particle lists.

According to the second embodiment, the calculation node 100 generates, for each particle belonging to the main region, a contact particle list, a global ID list, and a displacement list. Until completion of generating the contact particle list, global ID list, and displacement list of the current time step, the contact particle list, global ID list, and displacement list of the previous time step coexist temporarily. In addition, according to the second embodiment, the calculation node 100 sorts contact particles in contact with the target particle into contact particles belonging to the main region and those belonging to the skirt region. Then, the calculation node 100 divides each of the contact particle list, global ID list, and displacement list into a list associated with the main region and a list associated with the skirt region.

Specifically, the intermediate data storing unit 122 stores, for the previous time step, a main contact particle list 141, a global ID list 142, a displacement list 143, a skirt contact particle list 144, a global ID list 145, and a displacement list 146. In addition, the intermediate data storing unit 122 stores, for the current time step, a main contact particle list 151, a global ID list, 152, a displacement list 153, a skirt contact particle list 154, a global ID list 155, and a displacement list 156.

The main contact particle list 141 is data enumerating particle numbers of contact particles belonging to the main region amongst contact particles in contact with the target particle at the previous time step. The global ID list 142 is data enumerating global IDs of the contact particles registered in the main contact particle list 141. The displacement list 143 is data enumerating displacements in the tangential direction made up to the previous time step, associated with the target particle and the individual contact particles registered in the main contact particle list 141. All the main contact particle list 141, the global ID list 142, and the displacement list 143 have the same length. The $n^{th}$ particle number (n is an integer greater than or equal to 1) in the main contact particle list 141, the $n^{th}$ global ID in the global ID list 142, and the $n^{th}$ displacement in the displacement list 143 are information on the same contact particle.

The skirt contact particle list 144 is data enumerating particle numbers of contact particles belonging to the skirt region amongst the contact particles in contact with the target particle at the previous time step. The global ID list 145 is data enumerating global IDs of the contact particles registered in the skirt contact particle list 144. The displacement list 146 is data enumerating displacements in the tangential direction made up to the previous time step, associated with the target particle and the individual contact particles registered in the skirt contact particle list 144. All the skirt contact particle list 144, the global ID list 145, and the displacement list 146 have the same length. The $n^{th}$ particle number in the skirt contact particle list 144, the $n^{th}$ global ID in the global ID list 145, and the $n^{th}$ displacement in the displacement list 146 are information on the same contact particle.

The main contact particle list 151 is data enumerating particle numbers of contact particles belonging to the main region amongst contact particles in contact with the target particle at the current time step. The global ID list 152 is data enumerating global IDs of the contact particles registered in the main contact particle list 151. The displacement list 153 is data enumerating displacements in the tangential direction made up to the current time step, associated with the target particle and the individual contact particles registered in the main contact particle list 151. All the main contact particle list 151, the global ID list 152, and the displacement list 153 have the same length. The $n^{th}$ particle number in the main contact particle list 151, the $n^{th}$ global ID in the global ID list 152, and the $n^{th}$ displacement in the displacement list 153 are information on the same contact particle.

The skirt contact particle list 154 is data enumerating particle numbers of contact particles belonging to the skirt region amongst the contact particles in contact with the target particle at the current time step. The global ID list 155 is data enumerating global IDs of the contact particles registered in the skirt contact particle list 154. The displacement list 156 is data enumerating displacements in the tangential direction made up to the current time step, associated with the target particle and the individual contact particles registered in the skirt contact particle list 154. All the skirt contact particle list 154, the global ID list 155, and the displacement list 156 have the same length. The $n^{th}$ particle number in the skirt contact particle list 154, the $n^{th}$ global ID in the global ID list 155, and the $n^{th}$ displacement in the displacement list 156 are information on the same contact particle.

Note that the skirt contact particle lists 144 and 154, the global ID lists 145 and 155, and the displacement lists 146 and 156 generated for, amongst the particles belonging to the main region, particles close to the skirt region may individually contain one or more elements. On the other hand, the skirt contact particle lists 144 and 154, the global ID lists 145 and 155, and the displacement lists 146 and 156 generated for particles away from the skirt region are expected to be empty containing no elements. Therefore, the skirt contact particle lists 144 and 154, the global ID lists 145 and 155, and the displacement lists 146 and 156 generated for a great number of particles are empty.

Next described is a processing procedure of the calculation node 100.

Figure 13:
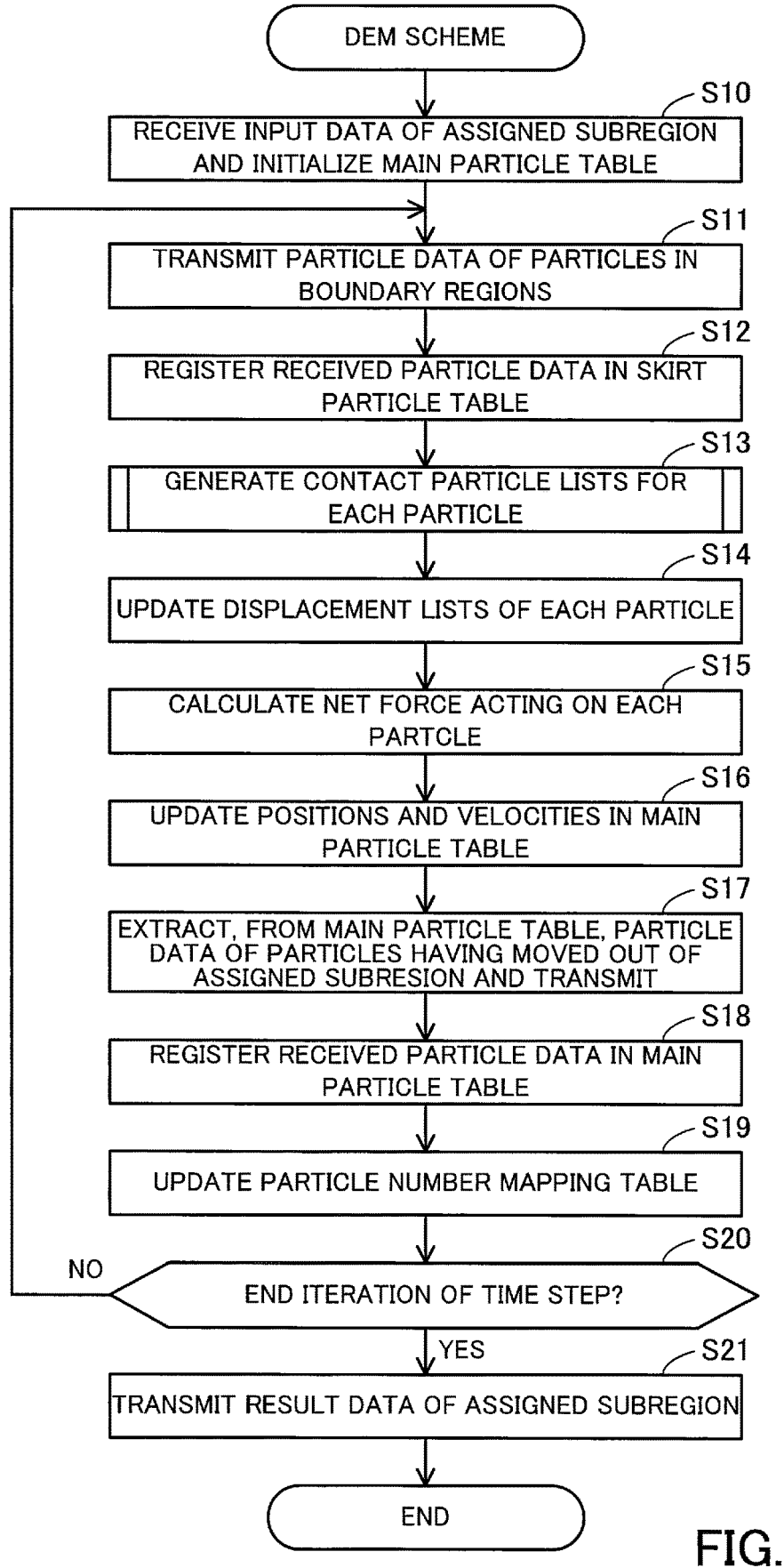
FIG. 13 is a flowchart illustrating an exemplary procedure of the DEM scheme.

FIG. 13 is a flowchart illustrating an exemplary procedure of the DEM scheme.

(Step S10) The data input and output unit 124 receives, from the management node 200, input data of the subregion of which the calculation node 100 is in charge. The time step executing unit 125 initializes the main particle table 132 based on the input data. The initialized main particle table 132 registers the global ID and position of each particle included in the input data. Then, in the main particle table 132, the velocity of each particle is set to 0. Note however that, if the input data includes initial values of the velocities, these values are registered in the main particle table 132 instead.

(Step S11) The interprocess communicating unit 126 searches the main particle table 132 for particle data of particles located in boundary regions amongst particles belonging to the main region. The boundary regions are, in the main region, regions within a predetermined distance from the skirt region. Whether a particle belongs to one or another boundary region is determined from the coordinate range of the subregion included in the input data and the coordinates of the position of the particle included in the main particle table 132. Particle data of one particle corresponds to one record in the main particle table 132, and includes the global ID, position, and velocity of the particle. The interprocess communicating unit 126 copies the particle data of the particles in the boundary regions, found in the main particle table 132 and transmits the particle data to the calculation nodes 100-1, 100-2, and 100-3.

(Step S12) The interprocess communicating unit 126 receives particle data of particles in boundary regions from the calculation nodes 100-1, 100-2, and 100-3. The particle data received here is that of particles belonging to the skirt region of the calculation node 100. The interprocess communicating unit 126 registers the received particle data in the skirt particle table 133. Particle data of one particle corresponds to one record in the skirt particle table 133, and includes the global ID, position, and velocity of the particle. Note that, if particle data of the previous time step remains in the skirt particle table 133, this particle data is discarded.

(Step S13) The time step executing unit 125 generates contact particle lists, global ID lists, and displacement lists for each particle belonging to the main region. Specifically, the time step executing unit 125 generates the following lists of the current time step: the main contact particle list 151; the skirt contact particle list 154; the global ID lists 152 and 155; and the displacement lists 153 and 156. The time step executing unit 125 discards the following lists of the previous time step after a copy process is completed: the main contact particle list 141; the skirt contact particle list 144; the global ID lists 142 and 145; and the displacement lists 143 and 146. The copy process may involve copying displacements from the displacement lists 143 and 146 of the previous time step to the displacement lists 153 and 156 of the current time step. The generation of the contact particle lists is described later in detail.

(Step S14) The time step executing unit 125 updates displacements included in the displacement lists 153 and 156 of each particle belonging to the main region. In the update of the displacement list 153, the time step executing unit 125 reads the velocity of each contact particle from the main particle table 132, then calculates the relative velocity of the target particle with respect to the contact particle, and calculates the tangential component of the relative velocity. The time step executing unit 125 calculates, based on the tangential component of the relative velocity, an incremental displacement in the tangential direction made from the previous time step to the current time step, and adds the calculated incremental displacement to the corresponding displacement in the displacement list 153. Similarly in the update of the displacement list 156, the time step executing unit 125 reads the velocity of each contact particle from the skirt particle table 133, then calculates an incremental displacement in the tangential direction made from the previous time step to the current time step, and adds the calculated incremental displacement to the corresponding displacement in the displacement list 156. Note that the updates of the displacement lists 153 and 156 may be carried out in step S13.

(Step S15) The time step executing unit 125 calculates the net force acting on each particle belonging to the main region. In the calculation of the net force, the time step executing unit 125 reads, from the main particle table 132, particle data associated with each particle number registered in the main contact particle list 151, and reads, from the skirt particle table 133, particle data associated with each particle number registered in the skirt contact particle list 154. With respect to each contact particle, the time step executing unit 125 calculates the contact force according to the aforementioned contact model based on the position and velocity of the target particle, the position and velocity of the contact particle, the displacement of the contact particle in the tangential direction, and the elastic modulus and viscous damping coefficient included in the input data. The time step executing unit 125 combines the contact force on the target particle exerted by one or more contact particles with external forces, such as gravity, to thereby compute the net force acting on the target particle.

(Step S16) With respect to each particle belonging to the main region, the time step executing unit 125 calculates the acceleration based on the net force calculated in step S15 and the mass of the particle, and then calculates the position and velocity for one unit time step later based on the calculated acceleration and the current position and velocity. The time step executing unit 125 updates the position and velocity of each particle registered in the main particle table 132. In addition, the time step executing unit 125 adds, to the result table 131, the position of each particle calculated for the next time step.

(Step S17) The interprocess communicating unit 126 extracts, from the main particle table 132, particle data of particles having moved out of the subregion (main region) assigned to the calculation node 100. Whether a particle has moved out of the subregion is determined from the coordinate range of the subregion included in the input data and the coordinates of the position of the particle included in the main particle table 132. The interprocess communicating unit 126 transmits the particle data extracted from the main particle table 132 to the calculation nodes 100-1, 100-2, and 100-3. The particle data to be transmitted includes global IDs, positions, and velocities. The extracted particle data is deleted from the main particle table 132. Note that, when one or more records are deleted from the main particle table 132, the remaining records may be shifted to fill the gap left by the deleted records so that no voids remain. In this case, the indices of the remaining records may be changed.

(Step S18) The interprocess communicating unit 126 receives, from the calculation nodes 100-1, 100-2, and 100-3, particle data of particles having moved into the subregion (main region) assigned to the calculation node 100. The received particle data includes global IDs, positions, and velocities. The interprocess communicating unit 126 inserts the received particle data into the main particle table 132. For example, new records are added to the end of the main particle table 132.

(Step S19) The interprocess communicating unit 126 monitors deletion and insertion of records in the main particle table 132 in steps S17 and S18 and tracks changes in indices of existing records remaining without being deleted. The existing records represent particles belonging to the main region at the current time step and remaining in the main region at the next time step. The interprocess communicating unit 126 generates a new particle number mapping table 134 that correlates particle numbers of the current time step and those of the next time step. The old particle number mapping table 134 may be discarded.

(Step S20) The time step executing unit 125 determines whether to end iteration of a time step. For example, the time step executing unit 125 determines whether the number of time steps has reached the maximum step number designated in the input data. If the time step executing unit 125 determines to end the iteration of a time step, the process moves to step S21. If not, the process returns to step S11.

(Step S21) The data input and output unit 124 reads the result table 131 from the result data storing unit 123 and transmits result data of the result table 131 to the management node 200.

Figure 14:
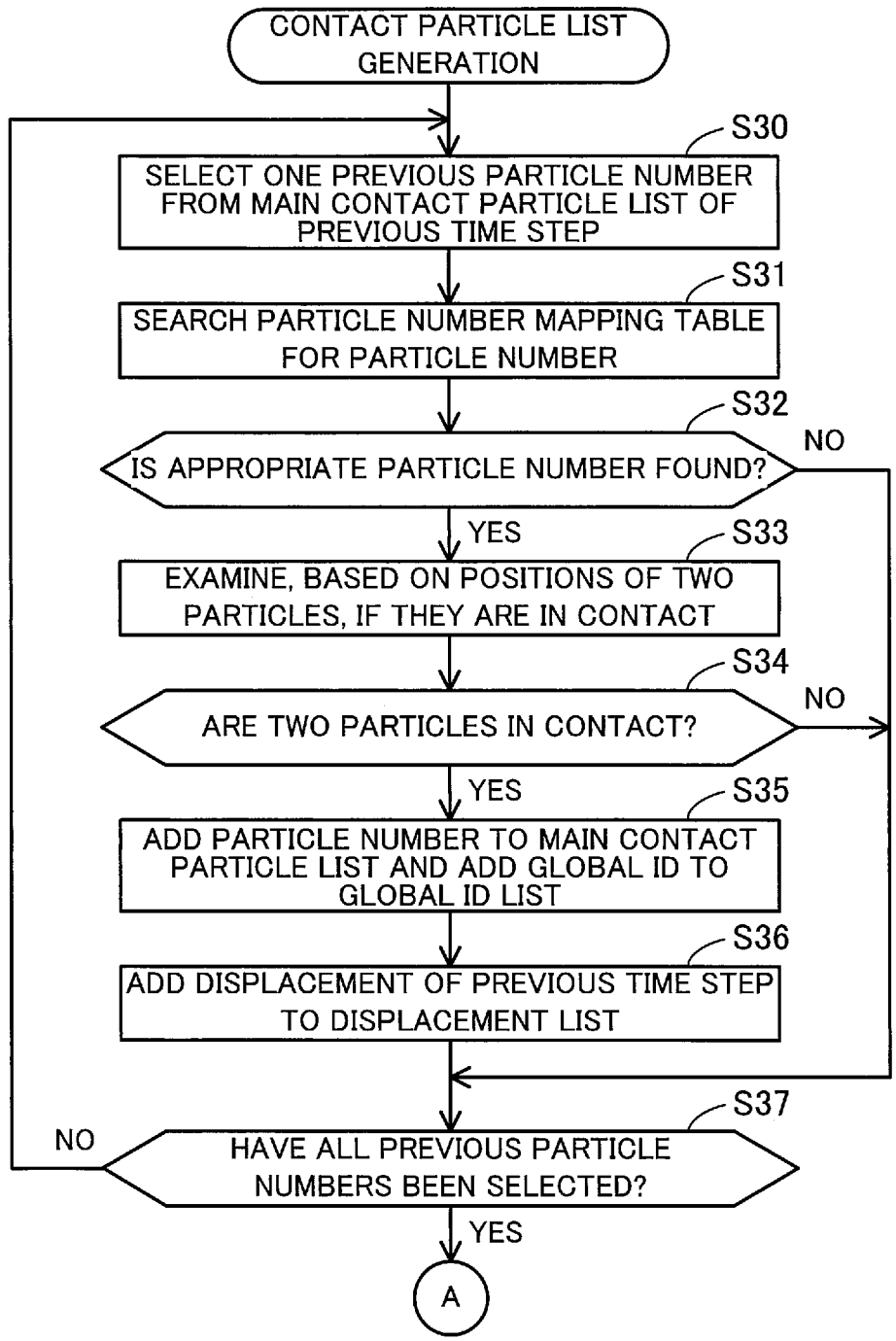
FIG. 14 is a first portion of a flowchart illustrating an exemplary procedure of contact particle list generation.

FIG. 14 is the first portion of a flowchart illustrating an exemplary procedure of contact particle list generation.

The contact particle list generation is carried out in step S13 described above. The contact particle list generation is performed for each particle belonging to the main region.

The following steps S30 to S37 include copying of a displacement of each contact particle that is in contact at the previous time step while belonging to the main region and then in contact at the current time step while belonging to the main region (hereinafter sometimes termed "main-main particle"). This contact particle corresponds to the aforementioned particle 63-1.

(Step S30) The time step executing unit 125 selects one previous particle number amongst the previous particle numbers registered in the main contact particle list 141 of the previous time step.

(Step S31) The time step executing unit 125 searches the particle number mapping table 134 for a particle number of the current time step corresponding to the previous particle number selected in step S30.

(Step S32) The time step executing unit 125 determines whether, in step S31, an appropriate particle number is found in the particle number mapping table 134. If an appropriate particle number is found, the process moves to step S33. If not, the process moves to step S37.

(Step S33) The time step executing unit 125 reads, from the main particle table 132, a position corresponding to the particle number found in step S31. The time step executing unit 125 examines, based on the position of the target particle and the position of a particle indicated by the found particle number, whether the particle of interest is in contact with the target particle. If the distance between the target particle and the particle of interest is less than or equal to the sum of the radii of the two particles, they are determined to be in contact with each other. If the distance between them is greater than the sum of the radii of the two particles, they are determined not to be in contact with each other. Note that the position of the target particle is read in advance from the main particle table 132.

(Step S34) The time step executing unit 125 determines whether the two particles are in contact with each other. If they are in contact with each other, the process moves to step S35. If not, the process moves to step S37.

(Step S35) The time step executing unit 125 adds the particle number of the particle of interest to the end of the main contact particle list 151 of the current time step. In addition, the time step executing unit 125 adds the global ID of the particle of interest to the end of the global ID list 152 of the current time step. The global ID may be obtained by reading, from the global ID list 142 of the previous time step, a global ID corresponding to the previous particle number selected in step S30, or reading, from the main particle table 132, one corresponding to the particle number of the current time step.

(Step S36) The time step executing unit 125 reads, from the displacement list 143 of the previous time step, a displacement corresponding to the previous particle number selected in step S30. The desired displacement in the displacement list 143 is accessible using the same index as the previous particle number of the main contact particle list 141. The time step executing unit 125 adds the read displacement to the end of the displacement list 153 of the current time step.

(Step S37) The time step executing unit 125 determines whether all the previous particle numbers of the main contact particle list 141 have been selected in step S30. If all the previous particle numbers have been selected, the process moves to step S38. If not, the process returns to step S30.

Figure 15:
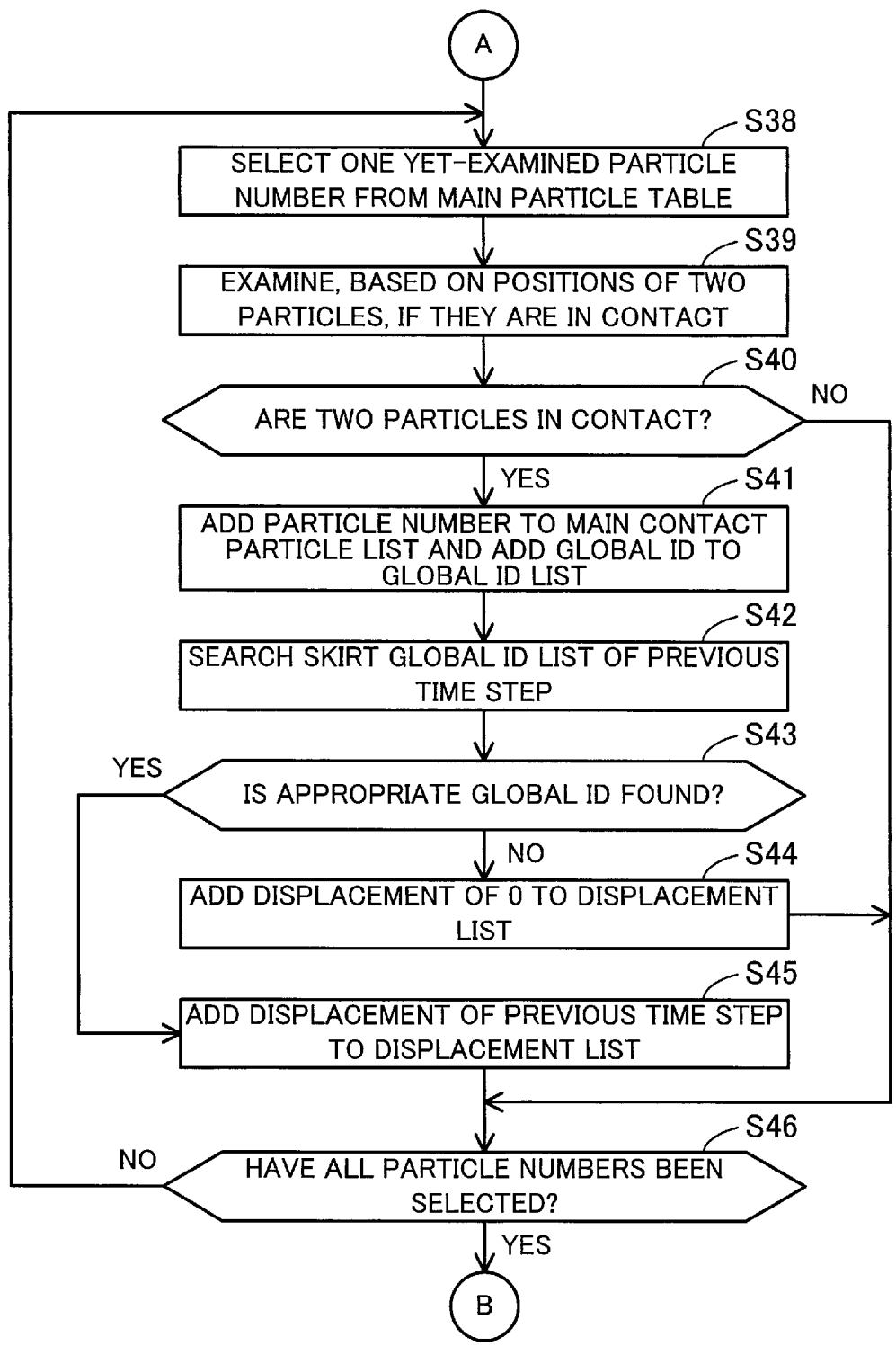
FIG. 15 is a second portion of the flowchart illustrating the exemplary procedure of contact particle list generation, continued from FIG. 14.

FIG. 15 is the second portion of the flowchart illustrating the exemplary procedure of contact particle list generation, continued from FIG. 14.

The following steps S38 to S46 include copying of a displacement of each contact particle that is in contact at the previous time step while belonging to the skirt region and then in contact at the current time step while belonging to the main region (hereinafter sometimes termed "skirt-main particle"). This contact particle corresponds to the aforementioned particle 63-2.

(Step S38) The time step executing unit 125 selects, from the main particle table 132, one particle number which is not the particle number of the target particle and has not been subjected to steps S30 to S37. Here flags may be used to indicate whether individual particle numbers have been subjected to steps S30 to S37. A particle indicated by the particle number selected here is a particle belonging to the main region for which contact with the target particle is not yet examined.

(Step S39) The time step executing unit 125 reads, from the main particle table 132, a position corresponding to the particle number selected in step S38. The time step executing unit 125 examines, based on the position of the target particle and the position of the particle indicated by the particle number, whether the particle of interest is in contact with the target particle.

(Step S40) The time step executing unit 125 determines whether the two particles are in contact with each other. If they are in contact with each other, the process moves to step S41. If not, the process moves to step S46.

(Step S41) The time step executing unit 125 adds the particle number of the particle of interest to the end of the main contact particle list 151 of the current step. In addition, the time step executing unit 125 reads, from the main particle table 132, a global ID corresponding to the particle number of the particle of interest, and adds the global ID of the particle of interest to the end of the global ID list 152 of the current time step.

(Step S42) The time step executing unit 125 scans the global ID list 145 of the previous time step from the top down to search for the global ID of the particle of interest. The global ID list 145 indicates particles belonging to the skirt region at the previous time step.

(Step S43) The time step executing unit 125 determines whether an appropriate global ID is found in step S42. If an appropriate global ID is found, the process moves to step S45. If not, the process moves to step S44.

(Step S44) The time step executing unit 125 adds, to the end of the displacement list 153 of the current time step, a numerical value indicating that the displacement is 0. Then the process moves to step S46.

(Step S45) The time step executing unit 125 reads, from the displacement list 146 of the previous time step, a displacement corresponding to the global ID detected in step S42. The desired displacement in the displacement list 146 is accessible using the same index as the global ID of the global ID list 145. The time step executing unit 125 adds the read displacement to the end of the displacement list 153 of the current time step.

(Step S46) The time step executing unit 125 determines whether all the particle numbers of the main particle table 132 have been selected in step S38. If all the particle numbers have been selected, the process moves to step S47. If not, the process returns to step S38.

Figure 16:
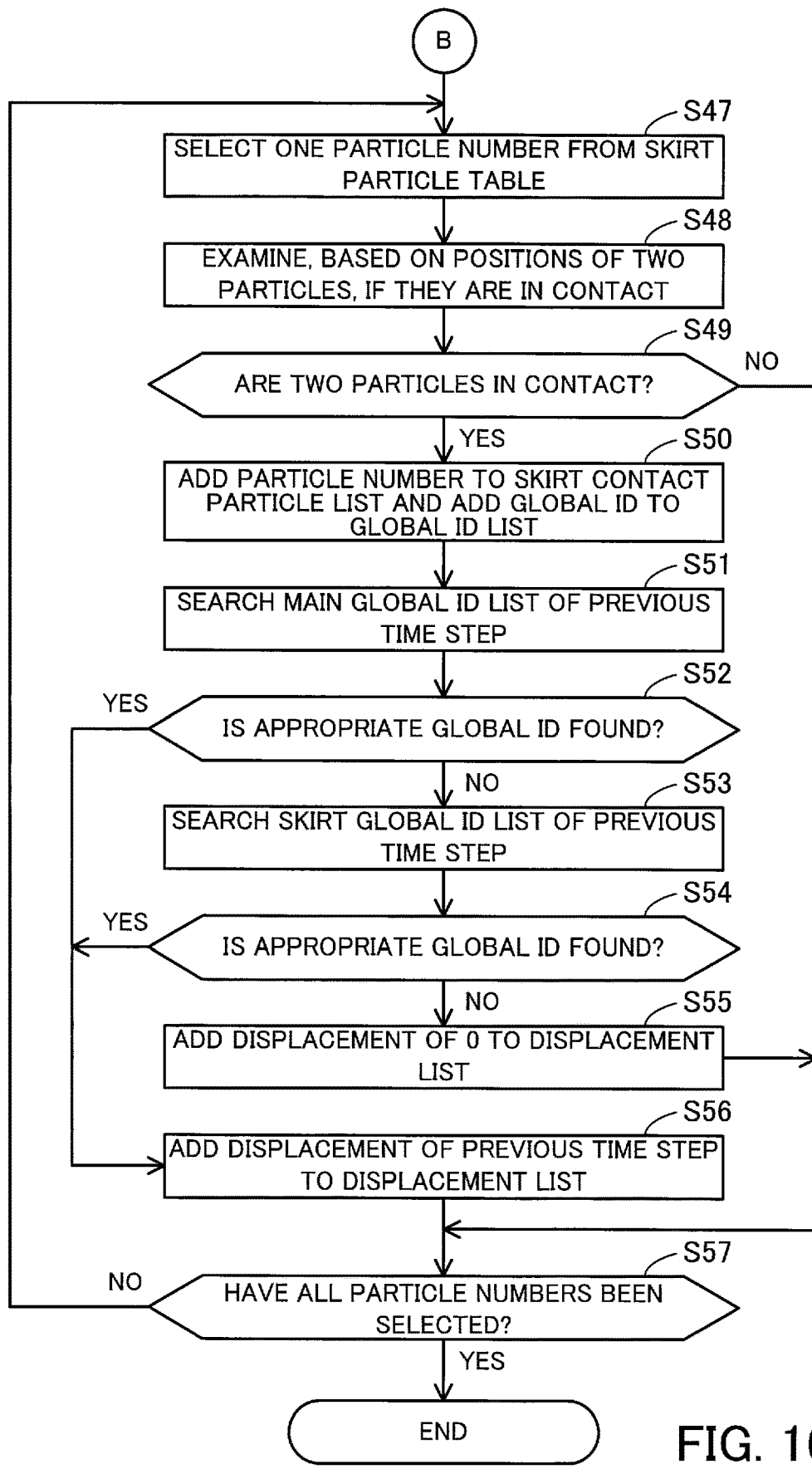
FIG. 16 is a third portion of the flowchart illustrating the exemplary procedure of contact particle list generation, continued from FIG. 15.

FIG. 16 is the third portion of the flowchart illustrating the exemplary procedure of contact particle list generation, continued from FIG. 15.

The following steps S47 to S57 include copying of a displacement of each contact particle that is in contact at the previous time step while belonging to the main region and then in contact at the current time step while belonging to the skirt region (hereinafter sometimes termed "main-skirt particle"). This contact particle corresponds to the aforementioned particle 63-3. In addition, steps S47 to S57 include copying of a displacement of each contact particle that is in contact while belonging to the skirt region at the previous time step and also in contact at the current time step while belonging to the skirt region (hereinafter sometimes termed "skirt-skirt particle"). This contact particle corresponds to the aforementioned particle 63-4.

(Step S47) The time step executing unit 125 refers to the skirt particle table 133 to select one from the particle numbers of particles belonging to the skirt region at the current time step. The particle numbers are formed by adding a predetermined prefix to the indices of the skirt particle table 133.

(Step S48) The time step executing unit 125 reads, from the skirt particle table 133, a position corresponding to the particle number selected in step S47. The time step executing unit 125 examines, based on the position of the target particle and the position of a particle indicated by the selected particle number, whether the particle of interest is in contact with the target particle.

(Step S49) The time step executing unit 125 determines whether the two particles are in contact with each other. If they are in contact with each other, the process moves to step S50. If not, the process moves to step S57.

(Step S50) The time step executing unit 125 adds the particle number of the particle of interest to the end of the skirt contact particle list 154 of the current time step. In addition, the time step executing unit 125 reads, from the skirt particle table 133, a global ID corresponding to the particle number of the particle of interest, and adds the global ID of the particle of interest to the end of the global ID list 155 of the current time step.

(Step S51) The time step executing unit 125 scans the global ID list 142 of the previous time step from the top down to search for the global ID of the particle of interest. The global ID list 142 indicates particles belonging to the main region at the previous time step.

(Step S52) The time step executing unit 125 determines whether an appropriate global ID is found in step S51. If an appropriate global ID is found, the process moves to step S56. If not, the process moves to step S53.

(Step S53) The time step executing unit 125 scans the global ID list 145 of the previous time step from the top down to search for the global ID of the particle of interest. The global ID list 145 indicates particles belonging to the skirt region at the previous time step.

(Step S54) The time step executing unit 125 determines whether an appropriate global ID is found in step S53. If an appropriate global ID is found, the process moves to step S56. If not, the process moves to step S55.

(Step S55) The time step executing unit 125 adds, to the end of the displacement list 156 of the current time step, a numerical value indicating that the displacement is 0. Then the process moves to step S57.

(Step S56) The time step executing unit 125 reads, from the displacement list 143 of the previous time step, a displacement corresponding to the global ID detected in step S51. The desired displacement in the displacement list 143 is accessible using the same index as the global ID of the global ID list 142. Alternatively, the time step executing unit 125 reads, from the displacement list 146 of the previous time step, a displacement corresponding to the global ID detected in step S53. The desired displacement in the displacement list 146 is accessible using the same index as the global ID of the global ID list 145. The time step executing unit 125 adds the read displacement to the end of the displacement list 156 of the current time step.

(Step S57) The time step executing unit 125 determines whether all the particle numbers of the skirt particle table 133 have been selected in step S47. If all the particle numbers have been selected, the contact particle list generation ends. If not, the process returns to step S47.

According to the information processing system of the second embodiment, in a particle simulation of the DEM scheme, a contact particle list enumerating contact particles and a displacement list enumerating displacements of the contact particles in the tangential direction are generated for each particle belonging to the main region. Therefore, it is possible to efficiently calculate the contact forces on each particle belonging to the main region exerted by the contact particles. In addition, the contact particle list is divided into a main contact particle list indicating contact particles belonging to the main region and a skirt contact particle list indicating contact particles belonging to the skirt region. This allows efficient management of information on the individual contact particles according to their belonging regions.

In addition, in generating the main contact particle list of the current time step, contact with the target particle is preferentially examined for particles registered in the main contact particle list of the previous time step. Subsequently, contact with the target particle is examined for particles not registered in the main contact particle list of the previous time step. Thus, for main-main particles, it is possible to efficiently copy their displacements from the displacement list of the previous time step to that of the current time step.

For example, detecting, from the main particle table, each contact particle belonging to the main region at the current step and searching for the contact particle from the main contact particle list of the previous time step involves repeated scans over the main contact particle list of the previous time step. The computational complexity is $O(N^2)$ where N is the average length of main contact particle lists. On the other hand, the second embodiment scans the main contact particle list of the previous time step just once to thereby identify main-main particles whose displacements are to be copied. Thus, it is possible to efficiently read displacements to be copied from the displacement list of the previous time step. In this manner, the number of scans over the main contact particle list of the previous time step is reduced, which results in a reduction of computational complexity to $O(N)$.

In addition, for each particle belonging to the main region, global ID lists enumerating global IDs of the contact particles are generated aside from the contact particle lists and displacement lists. This facilitates, for skirt-main particles, main-skirt particles, and skirt-skirt particles, efficient search for desired contact particles from the main and skirt contact particle lists of the previous time step. As a result, despite the particle number of each particle possibly being different between the previous time step and the current time step, efficient displacement copying is also implemented for contact particles other than main-main particles.

According to one aspect, it is possible to reduce computational complexity of particle simulations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a communication interface configured to communicate with a different information processing apparatus through a network;
a memory configured to store first contact data associated with a first particle belonging to a first region, the first contact data indicating one or more contact particles in contact with the first particle at a first time and a cumulative displacement of the first particle relative to each of the contact particles, having occurred over a contact period up to the first time after the contact is formed; and
a processor configured to execute a process including:
calculating first position data indicating positions of particles belonging to the first region at a second time following the first time, and receiving, from the different information processing apparatus through the network, second position data indicating positions of particles belonging to a second region at the second time, the second region bordering on the first region,
detecting, based on a calculation result obtained from the first contact data and the first position data, a second particle which is in contact with the first particle and belongs to the first region at the first time and belongs to the first region at the second time by scanning the first contact data once on the memory,
examining, based on the first position data, whether the first particle and the second particle are in contact with each other at the second time, and copying, when the first particle and the second particle are in contact at the second time, the cumulative displacement of the second particle from the first contact data to second contact data corresponding to the second time,
detecting, based on the first position data and the second position data, third particles which are particles, other than the second particle, individually belonging to the first region or the second region and are in contact with the first particle at the second time, and
searching the first contact data for the third particles by scanning the first contact data repeatedly on the memory and, copying, when each of the third particles is registered in the first contact data, the cumulative displacement of the registered third particle from the first contact data to the second contact data.

2. The information processing apparatus according to claim 1, wherein:
the first contact data uses, for particle identification, first identification information pieces individually assigned to each particle at the first time, and the first position data uses, for particle identification, second identification information pieces individually assigned to each particle at the second time,
the calculating of the first position data includes generating, for particles belonging to the first region at the first time and belonging to the first region at the second time, mapping data which represents mappings between the first identification information pieces and the second identification information pieces, and
the detecting of the second particle includes searching the mapping data for one of the second identification information pieces corresponding to each of the first identification information pieces included in the first contact data.

3. The information processing apparatus according to claim 2, wherein:
the first contact data further uses, for the particle identification, third identification information pieces individually assigned to each particle and remaining unchanged between the first time and the second time, and the first position data and the second position data include the third identification information pieces, and
the searching of the third particles includes searching the first contact data for the third particles by use of the third identification information pieces.

4. The information processing apparatus according to claim 1, wherein:
the first contact data includes first target region data corresponding to one or more contact particles belonging to the first region and first neighboring region data corresponding to one or more contact particles belonging to the second region,
the second contact data includes second target region data corresponding to one or more contact particles belonging to the first region and second neighboring region data corresponding to one or more contact particles belonging to the second region,
the detecting of the second particle includes detecting the second particle based on a calculation result obtained from the first target region data and the first position data, and
the copying of the cumulative displacement of the second particle includes copying of the displacement of the second particle from the first target region data to the second target region data.

5. The information processing apparatus according to claim 1, wherein:
the first contact data includes first target region data corresponding to one or more contact particles belonging to the first region and first neighboring region data corresponding to one or more contact particles belonging to the second region,
the second contact data includes second target region data corresponding to one or more contact particles belonging to the first region and second neighboring region data corresponding to one or more contact particles belonging to the second region, and
when each of the third particles belongs to the first region at the second time, the searching of the third particles includes searching the first neighboring region data for the third particle, and the copying of the cumulative displacement of the third particle includes copying, when the third particle is registered in the first neighboring region data, the cumulative displacement of the registered third particle from the first neighboring region data to the second target region data.

6. The information processing apparatus according to claim 1, wherein:
the first contact data includes first target region data corresponding to one or more contact particles belonging to the first region and first neighboring region data corresponding to one or more contact particles belonging to the second region, the second contact data includes second target region data corresponding to one or more contact particles belonging to the first region and second neighboring region data corresponding to one or more contact particles belonging to the second region, and when each of the third particles belongs to the second region at the second time, the searching of the third particles includes searching the first target region data and the first neighboring region data for the third particle, and the copying of the cumulative displacement of the third particle includes copying, when the third particle is registered in one of the first target region data and the first neighboring region data, the cumulative displacement of the registered third particle from the one registering the third particle to the second neighboring region data.

7. The information processing apparatus according to claim 1, wherein:

the cumulative displacement is a cumulative relative travel distance in a tangential direction made by the first particle relative to the contact particle over the contact period up to the first time.

8. A particle simulation method comprising:

acquiring, by a computer, first contact data associated with a first particle belonging to a first region, the first contact data indicating one or more contact particles in contact with the first particle at a first time and a cumulative displacement of the first particle relative to each of the contact particles, having occurred over a contact period up to the first time after the contact is formed;

calculating, by the computer, first position data indicating positions of particles belonging to the first region at a second time following the first time, and receiving, from a different computer through a network, second position data indicating positions of particles belonging to a second region at the second time, the second region bordering on the first region, the computer including a communication interface configured to communicate with the different computer through the network;

detecting, by the computer, based on a calculation result obtained from the first contact data and the first position data, a second particle which is in contact with the first particle and belongs to the first region at the first time and belongs to the first region at the second time by scanning the first contact data once on a memory included in the computer;

examining, by the computer, based on the first position data, whether the first particle and the second particle are in contact with each other at the second time, and copying, when the first particle and the second particle are in contact at the second time, the cumulative displacement of the second particle from the first contact data to second contact data corresponding to the second time;

detecting, by the computer, based on the first position data and the second position data, third particles which are particles, other than the second particle, individually belonging to the first region or the second region and are in contact with the first particle at the second time; and searching, by the computer, the first contact data for the third particles by scanning the first contact data repeatedly on the memory and, copying, when each of the third particles is registered in the first contact data, the cumulative displacement of the registered third particle from the first contact data to the second contact data.

9. A particle simulation system comprising:

a first information processing apparatus configured to store first contact data associated with a first particle belonging to a first region, the first contact data indicating one or more contact particles in contact with the first particle at a first time and a cumulative displacement of the first particle relative to each of the contact particles, having occurred over a contact period up to the first time after the contact is formed; and a second information processing apparatus configured to transmit, to the first information processing apparatus through a network, second position data indicating positions of particles belonging to a second region at a second time following the first time, the second region bordering on the first region, the first information processing apparatus includes a communication interface configured to communicate with the second information processing apparatus through the network, and the first information processing apparatus:

calculates first position data indicating positions of particles belonging to the first region at the second time, detects, based on a calculation result obtained from the first contact data and the first position data, a second particle which is in contact with the first particle and belongs to the first region at the first time and belongs to the first region at the second time by scanning the first contact data once on a memory included in the first information processing apparatus, examines, based on the first position data, whether the first particle and the second particle are in contact with each other at the second time, and copies, when the first particle and the second particle are in contact at the second time, the cumulative displacement of the second particle from the first contact data to second contact data corresponding to the second time, detects, based on the first position data and the second position data, third particles which are particles, other than the second particle, individually belonging to the first region or the second region and are in contact with the first particle at the second time, searches the first contact data for the third particles by scanning the first contact data repeatedly on the memory, and copies, when each of the third particles is registered in the first contact data, the cumulative displacement of the registered third particle from the first contact data to the second contact data.

* * * * *